United States Patent
Ando et al.

(10) Patent No.: US 6,780,965 B2
(45) Date of Patent: Aug. 24, 2004

(54) PLASTIC LENS

(75) Inventors: Masatoshi Ando, Tokyo (JP); Toshiyuki Miyake, Tokyo (JP); Yoshihiko Imanaka, Tokyo (JP)

(73) Assignee: Teijin Chemicals Ltd, Tokyo (JP)

( * ) Notice: Subject to any disclaimer, the term of this patent is extended or adjusted under 35 U.S.C. 154(b) by 192 days.

(21) Appl. No.: 10/070,273

(22) PCT Filed: Jul. 9, 2001

(86) PCT No.: PCT/JP01/05945
§ 371 (c)(1),
(2), (4) Date: Mar. 6, 2002

(87) PCT Pub. No.: WO02/04992
PCT Pub. Date: Jan. 17, 2002

(65) Prior Publication Data
US 2003/0055200 A1 Mar. 20, 2003

(30) Foreign Application Priority Data

| Jul. 11, 2000 | (JP) | 2000-210021 |
|---|---|---|
| Aug. 21, 2000 | (JP) | 2000-249440 |
| Feb. 5, 2001 | (JP) | 2001-027854 |
| Feb. 5, 2001 | (JP) | 2001-027855 |
| Mar. 28, 2001 | (JP) | 2001-092161 |

(51) Int. Cl.[7] .................................................. C08F 6/00
(52) U.S. Cl. ........................ 528/481; 528/196; 528/198; 528/502
(58) Field of Search ................... 528/196, 198, 528/481, 502

(56) References Cited

U.S. PATENT DOCUMENTS

| 4,501,875 A | 2/1985 | Mark | 528/196 |
|---|---|---|---|
| 5,432,250 A | * 7/1995 | Yamato et al. | 528/196 |

FOREIGN PATENT DOCUMENTS

| JP | 59-74121 | 4/1984 | C08G/63/62 |
|---|---|---|---|
| JP | 63-092642 | 4/1988 | C08G/63/62 |
| JP | 64-066234 | 3/1989 | C08G/63/62 |
| JP | 08-302005 | 11/1996 | C08G/64/30 |
| JP | 10-120777 | 5/1998 | C08G/64/06 |
| JP | 11-228683 | 8/1999 | C08G/64/16 |
| JP | 11-349676 | 12/1999 | C08G/64/16 |
| JP | 2000-063506 | 2/2000 | C08G/64/16 |
| WO | WO 00/18822 | 4/2000 | C08G/64/00 |

OTHER PUBLICATIONS

Adam, G.A. et al. Synthesis and Characterization of Some Copolycarbonates of 2,2–Bis (4–Hydroxyphenyl) Propane (Bisphenol–A) and 1,4–Bis (Hydroxymethyl) Cyclohexane, European Polymer Journal, vol. 12, pp 279–282 (1976).

Yenigul, M. et al. The Properties of Equimolar Copolycarbonates of Bisphenol a with Bisphenol S and 1,4–Bis (Hydroxymethyl) Cyclohexane, Polymer, vol. 24, pp 1313–1316 (Oct. 1983).

* cited by examiner

Primary Examiner—Terressa Boykin
(74) Attorney, Agent, or Firm—Sherman & Shalloway

(57) ABSTRACT

A plastic lens, an optical molded article, a film or a sheet formed of a copolycarbonate resin comprising a structural unit (I) of the following general formula (I), $$\left(\!OH_2C\!-\!\!\bigcirc\!\!-\!CH_2O\!-\!\overset{O}{\underset{\|}{C}}\!\right) \quad (I)$$

and a structural unit (II) of the following formula (II), $$\left(\!O\!-\!\!\underset{(R_1)_q}{\bigcirc}\!\!-\!W\!-\!\!\underset{(R_2)_r}{\bigcirc}\!\!-\!O\!-\!\overset{O}{\underset{\|}{C}}\!\right) \quad (II)$$

the structural unit (I) having a molar amount percentage of 15 to 85% on the basis of the total amount of the structural units (I) and (II).

According to the present invention, there are provided a plastic lens, an optical molded article, and the like, which are excellent in physical properties such as transparency, thermal stability and impact resistance and are excellent in optical properties such as a balance between a refractive index and an Abbe's number and a photoelasticity constant.

32 Claims, No Drawings

PLASTIC LENS

DETAILED DESCRIPTION OF THE INVENTION

1. Field of the Invention

The present invention relates to a plastic lens and a copolycarbonate resin to be used therefor. More specifically, it relates to a plastic lens and a copolycarbonate resin having transparency, heat resistance and impact resistance at high levels, having a well balance between a refractive index and an Abbe's number and having a low birefringence. The copolycarbonate resin of the present invention is excellent in the above optical properties and physical properties, so that it can be applied not only to various plastic lenses but also other optical molded articles, and since it is also excellent in flowability, it is suitable for easily molding and processing these molded articles.

2. Prior Art

A polycarbonate resin (to be sometimes referred to as "PC" hereinafter) is a polymer formed by bonding bisphenols with carbonate ester, and above all, a polycarbonate resin obtained from 2,2-bis(4-hydroxyphenyl)propane (so-called bisphenol A) is excellent in transparency and heat resistance and has properties excellent in mechanical properties such as impact resistance, so that it is used in many fields. In the optical fields of various lenses and optical disks, it attracts attention to its properties such as impact resistance, transparency and low water absorption, and it holds an important position as a material for optical use.

In the field of lenses in particular, PC that is a thermoplastic resin is of great interest thanks to excellent productivity and processibility, and demands thereof are increasing as a substitute for thermosetting resins typified by CR-39 (diethylene glycol bisallyl carbonate) that has been a mainstream material for plastic lenses.

However, a polycarbonate resin obtained by reacting bisphenol A with phosgene or a carbonate precursor substance such as diphenyl carbonate has a high refractive index of 1.585 but has a low Abbe's number of 30, so that it is liable to suffer a chromatic aberration problem and has a defect that it has a poor balance between the refractive index and the Abbe's number. Further, it has a defect that it has a large photoelasticity constant whereby molded article therefrom comes to have a large birefringence.

For overcoming the above defects of the polycarbonate resin, there have been proposed some copolycarbonate resins formed from bisphenols and aliphatic diols (JP-A-1-66234, JP-A-10-120777, JP-A-11-228683, JP-A-11-349676 and JP-A-2000-63506). These techniques involve problems that polycarbonate resins have a low refractive index and a low Abbe's number, that polycarbonate resins have a large photoelasticity constant and therefore come to have a large birefringence, that the moldability, heat resistance, etc., thereof are insufficient for obtaining satisfactory molded articles and that polycarbonate resins are colored.

PROBLEMS TO BE SOLVED BY THE INVENTION

It is a first object of the present invention to provide a plastic lens, particularly, a spectacle lens, which is excellent in transparency, heat resistance and impact resistance.

It is a second object of the present invention to provide a plastic lens, particularly, a spectacle lens, which has a good balance between refractive index and an Abbe's number and has a refractive index and an Abbe's number at good levels, and which has a low photoelasticity constant.

It is a third object of the present invention to provide an optical molded article having the above physical properties and optical properties.

It is another object of the present invention to provide a copolycarbonate resin that is suitable for producing the above plastic lens and the above optical molded article and has excellent flowability.

It is still another object of the present invention to provide means that permits production of a copolycarbonate resin having the above various excellent properties at a relatively low cost by selecting industrially advantageous raw materials and polymerization method(s).

MEANS TO SOLVE THE PROBLEMS

For overcoming the above problems, the present inventors have made studies in various ways and as a result have found that a lens formed of a copolycarbonate resin obtained from a dihydroxy compound component containing constant amounts of cyclohexanedimethanol and a specific bisphenol achieves the above objects of the present invention, and the present invention has been accordingly reached.

That is, according to the present invention, there is provided a plastic lens formed of a copolycarbonate resin comprising a structural unit (I) of the following general formula (I),

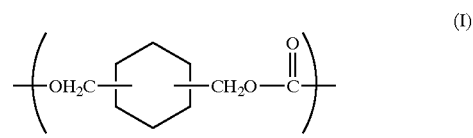

and a structural unit (II) of the following formula (II),

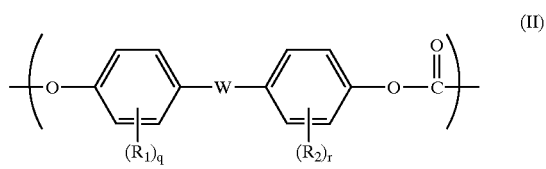

the structural unit (I) having a molar amount percentage of 15 to 85% on the basis of the total amount of the structural units (I) and (II).

In the above structural unit (II), each of $R_1$ and $R_2$ is independently a halogen atom, an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms or an aralkyloxy group having 7 to 20 carbon atoms, each of q and r is independently an integer of 0 to 4, W is a group represented by

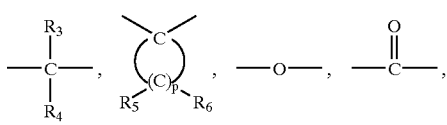

-continued

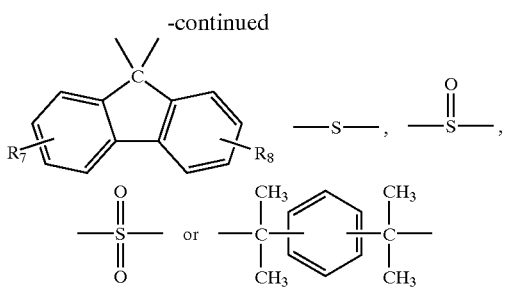

wherein each of $R_3$ and $R_4$ are the same as, or different from, each other and each is a hydrogen atom or a hydrocarbon group having 1 to 10 carbon atoms, each of $R_5$ and $R_6$ is independently a hydrogen atom or an alkyl group having 1 to 3 carbon atoms, p is an integer of 4 to 7, and each of $R_7$ and $R_8$ is independently a hydrogen atom, a halogen atom or an alkyl group having 1 to 3 carbon atoms.

The plastic lens of the present invention is not only excellent in transparency, impact resistance and heat resistance but also has a good balance between a refractive index and an Abbe's number, and it also has a low photoelasticity constant, so that it is particularly suitable as a spectacle lens. Moreover, it has high surface hardcoating properties and high impact resistance, so that there is provided a spectacle lens that has a small thickness but has high practical utility.

As far as the present inventors have searched for literatures, there are some literatures on copolycarbonate resins obtained by polymerizing cyclohexanedimethanol (CHDM) as a dihydroxy component together with bisphenol. Such literatures will be briefly described below.

(1) U.S. Pat. No. 4,501,875 (JP-A-59-74121)

This literature describes a copolycarbonate resin that is improved in processability by reacting dihdyric phenol and bishaloformate of aliphatic (or alicyclic) glycol with phosgene. Specifically, it is only described that a polycarbonate obtained by copolymerization of 4 mol % of bischloroformate of CHDM and bisphenol A is improved in flowability (melt flow) as compared with a polycarbonate obtained from bisphenol A alone, and that the thus-obtained polycarbonate shows a impact resistance value, a loaded flexure temperature and ductility nearly equivalent to those of the polycarbonate obtained from bisphenol A alone.

(2) JP-A-63-92642

This literature describes that a copolycarbonate obtained by ester exchange of bisphenol A and 2 to 4 mol %, based thereon, of CHDM with diphenyl carbonate is used as an optical disk substrate.

(3) JP-A-8-302005

This literature describes that a copolycarbonate is obtained by polymerization of bisphenol A and CHDM (4 mol %) with diphenyl carbonate according to an ester exchange reaction, that a large amount of the diphenyl carbonate is used in this case so that a polymer whose hydroxy terminal group content is extremely decreased can be obtained, and that the above polymer is improved in hydrolysis resistance.

(4) European Polymer Journal, Vol. 12, pp 279–282 (1976)

This literature describes that a copolycarbonate is obtained by uniform-solution polymerization of bisphenol A and CHDM with phosgene in a methylene chloride solvent in the presence of pyridine as an acid binder and that a copolycarbonate containing 1 to 50 mol % of CHDM is obtained in this case, and it also describes results of measurement of molecular weights by a GPC method and results of measurements of physical properties (tensile stress and breaking elongation). This literature describes nothing concerning the use of the obtained copolycarbonate and its optical use in particular.

(5) Polymer, 1983, Vol. 24, October pp. 1313–1316

This literature describes that a 50/50 (molar ratio) alternate copolycarbonate of bisphenol A and CHDM is obtained, and that the alternate copolycarbonate is obtained by uniform-solution polymerization of chloroformate of bisphenol A and CHDM in a methylene chloride solvent in the presence of pyridine as an acid binder, and it also describes results of measurement of physical properties (viscosity, glass transition point and aging characteristic) for comparing the above polycarbonate with a random copolycarbonate. This literature describes nothing concerning the use of the alternate copolycarbonate and its optical use in particular.

The plastic lens and the copolycarbonate resin provided by the present invention will be explained more in detail hereinafter.

The copolycarbonate resin of the present invention is formed of the following structural units (I) and (II) as already described, and the amount ratio of the structural unit (I) by molar percentage based on the total amount of the structural units (I) and (II) is 15 to 85%, preferably 20 to 80%.

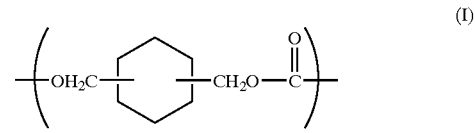

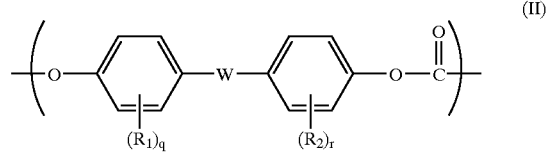

wherein $R_1$, $R_2$, W, q and r are as defined concerning the foregoing structural unit (II).

The above structural units (I) and (II) are units formed by using cyclohexanedimethanol of the following formula (I-R) and bisphenol of the following formula (II-R) as dihydroxy compound components in the production of the polycarbonate resin.

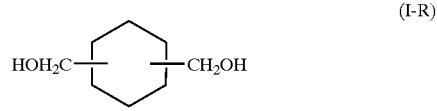

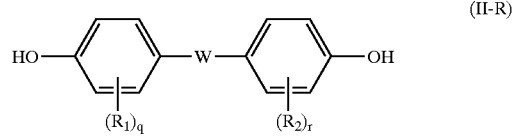

In the formula (II-R), $R_1$, $R_2$, W, q and r are as defined concerning the foregoing structural unit (II).

With regard to the cyclohexanedimethanol (I-R) and the bisphenol (II-R) as dihydroxy compounds for use in the production of the copolycarbonate resin of the present invention, specific compounds thereof will be explained below.

The cyclohexanedimethanol of the above formula (I-R) may be a cis-isomeric compound or a trans-isomeric compound or a mixture of a cis-isomeric compound and a trans-isomeric compound, and it includes 1,2-cyclohexanedimethanol, 1,3-cyclohexanedimethanol and 1,4-cyclohexanedimethanol. Of these, 1,4-cyclohexanedimethanol is preferred. These compounds may be used alone or in combination of two or more.

Preferably, 1,4-cyclohexanedimethanol is used as a cyclohexanedimethanol, and it has a trans/cis ratio in the range of from 100/0 to 50/50. The trans/cis ratio is more preferably 100/0 to 60/40, still more preferably 100/0 to 70/30, most preferably 100/0 to 80/20. With an increase in the amount ratio of the trans-isomeric compound, the glass transition temperature (Tg) of the copolycarbonate resin obtained increases, so that the copolycarbonate resin is improved in heat resistance. That is, in case that the 1,4-cyclohexanedimethanol/bisphenol A molar ratio for copolycarbonate resins is 50/50, when the 1,4-cyclohexanedimethanol has a trans/cis ratio of 50/50, the resin has a glass transition temperature (Tg) of 89° C., and when the 1,4-cyclohexanedimethanol has a tarns/cis ratio of 99/1, the resin has a glass transition temperature (Tg) of 96° C. For obtaining 1,4-cyclohexanedimethanol having a highest tarns/cis ratio, there can be employed a method that is known per se. For example, 1,4-cyclohexanedimethanol having a high trans-isomeric compound content can be obtained by repeating recrystallization in an organic solvent.

The bisphenol of the above formula (II-R) is preferably a group of the formula (II-R) in which W is

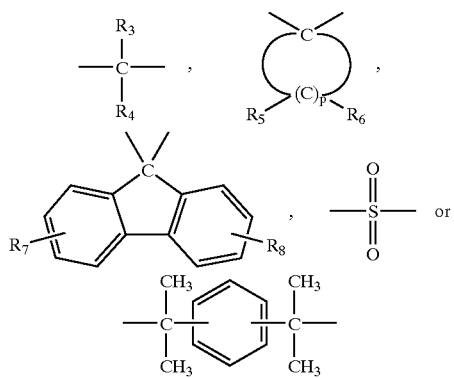

wherein $R_3$, $R_4$, $R_5$, $R_6$, $R_7$, $R_8$ and p are as defined concerning the foregoing structural unit (II). Specific examples of the bisphenol include 4,4'-dihydroxybiphenyl, bis(4-hydroxyphenyl)methane, 1,1-bis(4-hydroxyphenyl) ethane, 1,1-bis(4-hydroxyphenyl)-1-phenylethane, 2,2-bis (4-hydroxyphenyl)propane, 2,2-bis(3-methyl-4-hydroxyphenyl)propane, 1,1-bis(4-hydroxyphenyl) cyclohexane, 1,1-bis(4-hydroxyphenyl)-3,3,5-trimethylcyclohexane, 2,2-bis(3-phenyl-4-hydroxyphenyl) propane, 2,2-bis(3-isopropyl-4-hydroxyphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl)propane, 2,2-bis(4-hydroxy-3,5-dibromophenyl)propane, 2,2-bis(4-hydroxy-3, 5-dichlorophenyl)propane, 2,2-bis(4-hydroxy-3,5-dimethylphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl) diphenylmethane, 9,9-bis(4-hydroxyphenyl)fluorene, 9,9-bis(4-hydroxy-3-methylphenyl)fluorene, 1,1-bis(4-hydroxyphenyl)cyclopentane, 4,4'-dihydroxydiphenyl ether, 4,4'-dihydroxy-3,3'-dimethyldiphenyl ether, 4,4'-dihydroxydiphenylsulfone, 4,4'-dihydroxydiphenylsulfoxide, 4,4'-dihydroxydiphenylsulfide, 3,3'-dimethyl-4,4'-dihydroxydiphenylsulfide, 3,3'-dimethyl-4,4'-dihydroxydiphenylsulfoxide, 3,3'-dimethyl-4,4'-dihydroxydiphenylsulfone, 4,4'-dihydroxy-3,3'-diphenylsulfide, 4,4'-dihydroxy-3,3'-diphenylsulfoxide, 4,4'-dihydroxy-3,3'-diphenylsulfone, 1,3-bis{2-(4-hydroxyphenyl)propyl}benzene and 1,4-bis{2-(4-hydroxyphenyl)propyl}benzene. Of these, preferred are 1,1-bis(4-hydroxyphenyl)-1-phenylethane, 2,2-bis(4-hydroxyphenyl)propane, 2,2-bis(3-methyl-4-hydroxyphenyl)propane, 2,2-bis(4-hydroxy-3,5-dibromophenyl)propane, 1,1-bis(4-hydroxyphenyl) cyclohexane, 1,1-bis(4-hydroxyphenyl)-3,3,5-trimethylcyclohexane, 4,4'-dihydroxydiphenylsulfone, 3,3'-dimethyl-4,4'-dihydroxydiphenylsulfone, 9,9-bis(4-hydroxy-3-methylphenyl)fluorene, 1,3-bis{2-(4-hydroxyphenyl)propyl}benzene and 1,4-bis{2-(4-hydroxyphenyl)propyl}benzene. More preferred are 2,2-bis (4-hydroxyphenyl)propane, 1,1-bis(4-hydroxyphenyl) cyclohexane, 1,1-bis(4-hydroxyphenyl)-3,3,5-trimethylcyclohexane, 4,4'-dihydroxydiphenylsulfone and 9,9-bis(4-hydroxy-3-methylphenyl)fluorene. Particularly preferred is 2,2-bis(4-hydroxyphenyl)propane (so-called bisphenol A) or 1,1-bis(4-hydroxyphenyl)cyclohexane. These may be used alone or in combination of two or more.

When the total molar percentage of structural units of the copolycarbonate resin of the present invention is taken as 100%, the molar percentage of the structural unit of the general formula (I) is 15 to 85%, preferably 20 to 80%, more preferably 20 to 70%, still more preferably 30 to 70% most preferably 30 to 50%. When the molar percentage of the structural unit (I) exceeds 85%, the copolycarbonate resin is sometimes caused to suffer a decrease in heat resistance and a decrease in refractive index. When it is less than 15%, the copolycarbonate resin has a decreased Abbe's number and has a poor balance between a refractive index and an Abbe's number, so that the copolycarbonate resin is undesirable as a lens material.

The copolycarbonate resin to be used for the plastic lens of the present invention has a relatively low polymerization degree value in view of processability and optical properties. That is, the polymerization degree in terms of a specific viscosity is properly in the range of from 0.3 to 0.6, preferably in the range of from 0.3 to 0.56. The copolycarbonate resin having a specific viscosity in the above range has excellent flowability (Q value) as will be described later, and it is easily moldable by melt injection molding. Further, a lens obtained is almost free of an optical strain.

The copolycarbonate resin of the present invention has excellent flowability during melting and has a very high value of flowability (Q value) measured according to a measurement method to be described later. While a homopolycarbonate resin from bisphenol A has a flowability (Q value) of $4.2 \times 10^{-3}$ cm$^3$/s, the flowability (Q value) of the copolycarbonate resin of the present invention is from $20 \times 10^{-3}$ to $200 \times 10^{-3}$ cm$^3$/s, preferably $25 \times 10^{-3}$ to $200 \times 10^{-3}$ cm$^3$/s, most preferably $35 \times 10^{-3}$ to $180 \times 10^{-3}$ cm$^3$/s.

The plastic lens of the present invention has relatively high levels of a refractive index and an Abbe's number since it is formed of the above copolycarbonate resin, and these values are well-balanced, so that the plastic lens of the present invention is suitable for a spectacle. That is, the refractive index of the plastic lens of the present invention is in the range of from 1.500 to 1.600, preferably from 1.530 to 1.590, most preferably from 1.540 to 1.580 and Abbe's number of the plastic lens of the present invention is in the range of from 31 to 48, preferably from 32 to 45.

The copolycarbonate resin for forming the plastic lens of the present invention has preferred modes with regard to its terminal groups and a molecular weight distribution. The above copolycarbonate resin has a terminal group formed of a phenolic hydroxyl group (OH group) derived from the bisphenol used as a source monomer. Advantageously, the content of terminals formed of a phenolic hydroxyl group (OH group) each based on the total amount of terminal groups thereof is in the range of from 1 to 80 mol %, preferably in the range of from 2 to 70 mol %. The terminal groups of the copolycarbonate resin are substantially formed of phenolic hydroxyl terminal group and aryl or alkyl terminal groups (e.g., phenyl group, substituted phenyl group, methyl group or ethyl group) having no phenolic hydroxyl group. The "total amount of terminal groups" therefore substantially means the total amount of the phenolic hydroxyl groups and the above aryl or alkyl terminal groups.

The present invention therefore uses a copolycarbonate resin having a phenolic hydroxyl terminal group of 1 to 80 mol % when the above total amount is taken as 100 mol %.

Meanwhile, the copolycarbonate resin of the present invention preferably has a constant range of a molecular weight distribution. The above molecular weight distribution in terms of a weight average molecular weight (Mw)/ number average molecular weight (Mn) (Mw/Mn) is in the range of from 1.1 to 3, preferably in the range of from 1.3 to 2.8, and a copolycarbonate resin having a molecular weight distribution in such a range is advantageously used. The above weight average molecular weight (Mw) and number average molecular weight (Mn) are determined on the basis of measurement methods to be described later.

The copolycarbonate resin having the above terminal groups and the above molecular weight distribution can be obtained by controlling the amount ratio of a carbonate ester and reaction conditions in a method in which polymerization is carried out to produce the resin by ester exchange method using the carbonate ester (diphenyl carbonate in particular) as a carbonate precursor, as will be explained later.

The copolycarbonate resin having the above terminal groups and the above molecular weight distribution is excellent in processability of a lens, a lens obtained is excellent in heat resistance, impact resistance and hue, and the processability in processing a lens surface for forming a hard coating layer is made easy, which serves to form a uniformly and strongly bonding hard coating layer.

The polymerization method for producing the copolycarbonate resin of the present invention will be explained below.

The production of the copolycarbonate resin of the present invention uses cyclohexanedimethanol of the following formula (I-R) and bisphenol of the following formula (II-R) as main dihydroxy compounds.

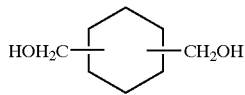
(I-R)

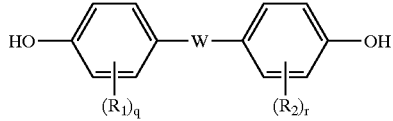
(II-R)

In the formula (II-R), $R_1$, $R_2$, W, q and r are as defined concerning the foregoing structural unit (II).

The polymerization method is preferably selected from a method (solution polymerization method) in which the above two dihydroxy compounds and phosgene are reacted in the presence of an acid binder or a method (ester exchange method) in which the above two dihydroxy compounds are ester-exchanged with a carbonate ester.

Of these, the ester-exchange method is advantageous. The ester-exchange method is not limited in polymerization mode and method. For example, both a melt polymerization method and a solid phase polymerization method may be employed, and the melt polymerization method is industrially desirable.

In the solution polymerization method, the acid binder includes aromatic tertinary amines such as pyridine, quinoline, isoquinoline and dimethylaniline, and pyridine is particularly preferably used. The reaction is carried out in the presence of the acid binder alone, or the acid binder dilated by an organic solvent in a solution. The above organic solvent is selected from hydrocarbons such as benzene, toluene and xylene or halogenated hydrocarbons such as methylene chloride, chloroform, dichloroethane, chlorobenzene and dichlorobenzene. Particularly, halogenated hydrocarbons such as methylene chloride, chloroform, dichloroethane, chlorobenzene and dichlorobenzene are preferred, and methylene chloride is the most preferred. The amount of the acid binder based on phosgene is generally 2 to 100 mole equivalent weights, preferably 2 to 50 mole equivalent weights. The reaction temperature is generally 0 to 100° C., preferably 0 to 40° C. The reaction time period is generally several minutes to several days, preferably 10 minutes to 5 hours. Further, a monofunctional phenol may be used as a terminal stopper. The monofunctional phenol is generally used as a terminal stopper for adjusting a molecular weight, and the thus-obtained copolycarbonate resin comes to have terminals that are blocked with groups based on the monofunctional phenol. Specific examples of the above monofunctional phenol include phenol, p-tert-butylphenol, p-cumylphenol and isooctylphenol. Further, as other monofunctional phenol, there may be used a phenol or benzoic acid chloride having a long-chain alkyl group or aliphatic polyester group as a substituent or a long-chain alkylcarboxylic acid chloride.

Desirably, the above terminal stopper is introduced into terminals such that the content thereof based on the amount of the total terminals of the polycarbonate resin obtained is at least 5 mol %, preferably at least 10 mol %. The above terminal stoppers may be used alone or in combination of two or more.

In the melt-polymerization method according to the ester-exchange method, the dihydroxy compounds and the carbonate ester are mixed under heat in the presence of an inert gas, and a formed alcohol or phenol is distilled off. While the reaction temperature differs depending upon the boiling point of the formed alcohol or phenol, it is generally in the range of from 120 to 350° C. At a later stage of the reaction, the reaction system is pressure-reduced to approximately 1,330 to 13.3 Pa to easily distill off the formed alcohol or phenol. The reaction time period is generally approximately 1 to 10 hours.

The carbonate ester includes esters of an optionally substituted aryl group having 6 to 12 carbon atoms, an aralkyl group or an alkyl group having 1 to 4 carbon atoms. Specific examples thereof include diphenyl carbonate, bis(chlorophenyl)carbonate, dinaphthyl carbonate, bis(diphenyl)carbonate, dimethyl carbonate, diethyl carbonate and dibutyl carbonate, and of these, diphenyl carbonate is preferred.

The amount of the carbonate ester per mole of the dihydroxy compounds is preferably in the range of from 0.97 to 1.2 mol, particularly preferably in the range of from 1.0 to 1.1 mol.

In the ester-exchange method, a polymerization catalyst can be used for increasing the polymerization rate. The polymerization catalyst can be selected from catalysts that are generally used for esterification reactions and ester-exchange reactions. Examples of the polymerization catalyst include alkali metal compounds such as sodium hydroxide, potassium hydroxide and sodium salt or potassium salt of a dihydric phenol; alkaline earth metal compounds such as calcium hydroxide, barium hydroxide and magnesium hydroxide; nitrogen-containing basic compounds such as tetramethylammonium hydroxide, tetraethylammonium hydroxide, timethylamine and triethylamine; alkoxides of alkali metals or alkaline earth metals; organic acid salts of alkali metals or alkaline earth metals; zinc compounds; boron compounds; aluminum compounds; silicon compounds; germanium compounds, organotin compounds; lead compounds; osmium compounds; antimony compounds; manganese compounds; titanium compounds; and zirconium compounds. The above catalysts may be used alone or in combination of two or more. The amount of the polymerization catalyst per mole of the dihydroxy compounds as raw materials is preferably in the range of from $1 \times 10^{-9}$ to $1 \times 10^{-2}$ equivalent weight, more preferably in the range of from $1 \times 10^{-8}$ to $5 \times 10^{-3}$ equivalent weight.

Further, a molecular weight adjusting agent, an antioxidant, etc., may be added as required.

A catalyst deactivator may be added to the obtained copolycarbonate. As a catalyst deactivator, known catalyst deactivators are effectively used. Of these, ammonium salts and phosphonium salts of sulfonic acids are preferred. Further preferred are the above salts of dodecylbenzenesulfonic acid such as tetrabutylphosphonium salt of dodecylbenzenesulfonic acid, and the above salts of p-toluenesulfonic acid such as tetrabutylammonium salt of p-toluenesulfonic acid. As an ester of sulfonic acid, there are preferably used methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate. Of these, tetrabutylphosphonium salt of dodecylbenzenesulfonic acid is the most preferred.

The amount of the above catalyst deactivator per mole of the above polymerization catalyst selected from the alkali metal compounds and/or the alkaline earth metal compounds is 0.5 to 50 mol, preferably 0.5 to 10 mol, more preferably 0.8 to 5 mol. The catalyst deactivator can be used in such an amount ratio.

According to studies made by the present inventors, the copolycarbonate resin of the present invention varies to some extent in physical properties, particularly, glass transition temperature and flowability (Q value) depending upon a polymerization method. It is assumed that the above variation is caused by a difference in amount ratio of the structural unit (I) and the structural unit (II) alternately arranged on a main polymer chain as described later.

That is, the copolycarbonate resin of the present invention is constituted of two carbonate bond types, one having a structure (i) in which a carbonate bond (—O—CO—O—) forms a center, the structural unit (I) bonds to one side of the central carbonate bond and the structural unit (II) bonds to the other side (to be referred to as "hetero-carbonate" hereinafter) and the other having a structure (ii) in which a carbonate bond (—O—CO—O—) forms a center and the structural units (I) bond to both the sides or the structural units (II) bond to both the sides (to be referred to as "homo-carbonate" hereinafter).

A polycarbonate having a unit from 1,4-cyclohexanedimethanol as the structural unit (I) and a unit from bisphenol A as the structural unit (II) will be explained as an example. The hetero-carbonate (C-1) and the homo-carbonates (C-2 and C-3) are represented by the following chemical structural formulae.

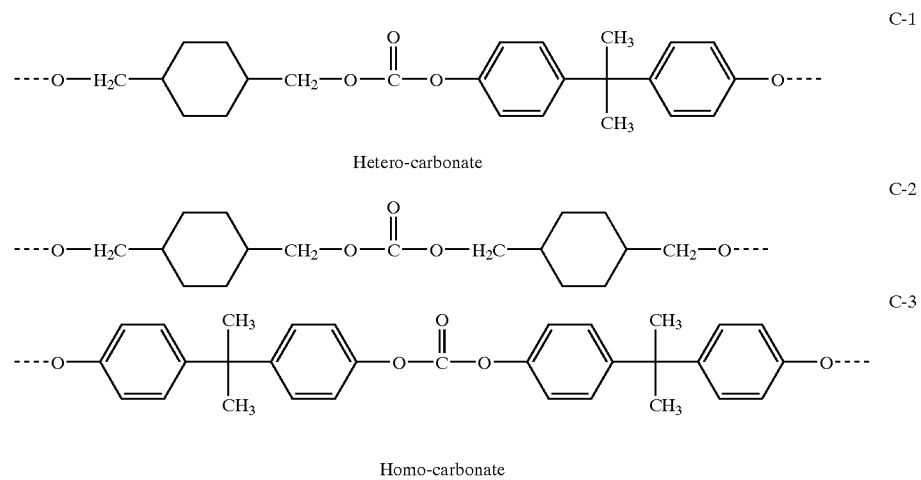

Hetero-carbonate

Homo-carbonate

When 1,4-cyclohexanedimethanol and bisphenol A are used in an amount ratio of 50/50 (mol %) as dihydroxy compounds for the production of the copolycarbonate resin, and if it is assumed that the reaction proceeds on the basis of a probability theory, the ratio of the above hetero-carbonate (C-1): homo-carbonate (C-2): homo-carbonate (C-3) comes to be 50:25:25. That is, the hetero-carbonate (C-1): homo-carbonates (C-2+C-3) ratio is calculated to be 50:50.

However, the present inventors have conducted experiments and found that when 1,4-cyclohexanedimethanol and bisphenol A are used in an amount ratio of 50/50 (mol %) as dihydroxy compounds to produce a copolycarbonate resin, the thus-obtained resin does not necessarily have a heterocarbonate (C-1):homo-carbonates (C-2+C-3) ratio of 50:50, and that the above ratio varies to some extent depending upon a polymerization method.

In a solution polymerization method using an aromatic tertiary amine such as pyridine as the above acid binder and phosgene as a carbonate precursor, there is obtained a copolycarbonate resin having a hetero-carbonate:homo-carbonates ratio, for example, of 44:56 in which the amount ratio of the hetero-carbonate is very close to a probability theory. In a melt polymerization method using carbonate ester (e.g., diphenyl carbonate) as a carbonate precursor, there is obtained a copolycarbonate resin having a hetero-carbonate:homo-carbonates ratio, for example, of 70:30 in which the amount ratio of the hetero-carbonate is considerably high over 50 mol %. The above examples of the solution polymerization method and the melt polymerization method show cases where 1,4-cyclohexanedimethanol and bisphenol A were used in an amount ratio of 50/50 (mol %) as dihydroxy compounds. As will be clear from Examples to be described later, the amount ratio of the hetero-carbonate and the homo-carbonates naturally varies depending upon the amount ratio of the cyclohexanedimethanol and bisphenol used. However, it has been found that when the amount ratio of the dihydroxy compounds is constant, the melt polymerization method gives a copolycarbonate having a higher amount ratio of the hetero-carbonates as compared with the solution polymerization method.

That is, when the amount ratio of the structural unit (I):structural unit (II) by molar ratio is m:n (provided that the total of m and n is 1), there is obtained a copolycarbonate resin having a hetero-carbonate content of at least (2.05× m×n), preferably at least (2.1×m×n) according to the present invention. In other words, the above content of the hetero-carbonate means the amount ratio of carbonate bonds formed of alternate arrangements of the structural unit (I) and the structural unit (II) in the main polymer chain, and it is the amount ration when the total of the carbonate bonds (m+n) is taken as 1.

The copolycarbonate resin having a hetero-carbonate content of at least (2.05×m×n) as described above is obtained as a copolycarbonate resin of which the structural unit (I) molar percentage based on the total of the structural unit (I) and the structural unit (II) is in the range of 15 to 85 mol %, by the melt-polymerization method. The copolycarbonate resin having a hetero-carbonate content of at least (2.05×m×n), particularly, at least (2.1×m×n) gives a lens having a refractive index, an Abbe's number and a photoelasticity constant nearly equal to those of a lens given by a copolycarbonate resin having a smaller hetero-carbonate content than the above content. In the former copolycarbonate resin, however, the flowability (Q value) is improved with an increase in the hetero-carbonate content.

The copolycarbonate resin of the present invention comprises the structural unit (I) and the structural units (II), and it has been found that a plastic lens more improved in optical properties and heat resistance can be obtained by using a combination of specific two types included in the structural unit (II). Structural units of the above two specific types are represented by the following (II-a) and (II-b). (II-a) is a structural unit derived from bisphenol A that is used as the bisphenol.

Structural unit (II-a)

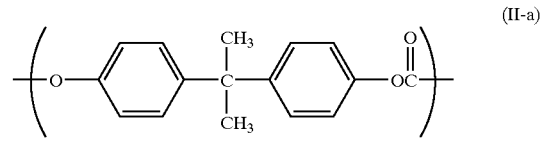

Structural Unit (II-b)

While the structural unit (II-b) is selected from the group consisting of the following (II-b-1) and (II-b-2), the unit of (II-b-1) is preferred.

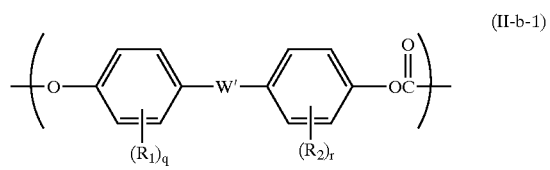

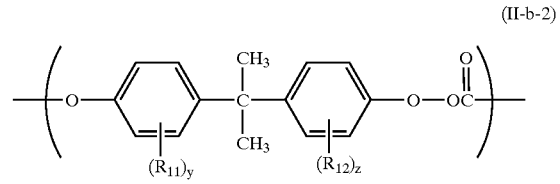

In the above structural units (II-b-1) and (II-b-2), each of $R_1$ and $R_2$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, each of q and r is an integer of 0 to 4, W' is an alicyclic hydrocarbon group having 5 to 12 carbon atoms or a group represented by

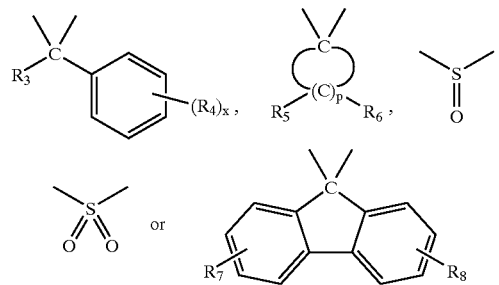

wherein $R_3$ and $R_4$ are the same as, or different from, each other and each is a hydrogen atom or a hydrocarbon group having 1 to 10 carbon atoms, x is an integer of 1 to 5, each of $R_5$ and $R_6$ is independently a hydrogen atom or an alkyl group having 1 to 3 carbon atoms, p is an integer of 4 to 7, each of $R_7$ and $R_8$ is independently a hydrogen atom, a halogen atom or an alkyl group having 1 to 3 carbon atoms, each of $R_{11}$ and $R_{12}$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, and each of y and z is an integer of 1 to 4.

Of the above structural unit (II-b), (II-b-1) is preferred, and further, the following units are particularly preferred as the (II-b-1).

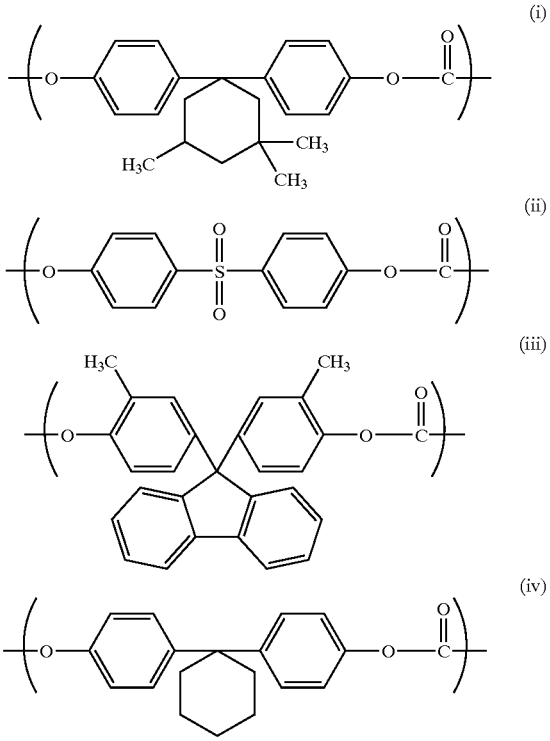

These units (i), (ii) (iii) and (vi) coming under (II-b) are structural units derived from (i) 1,1-bis(4-hydroxyphenyl)-3,3,5-trimethylcyclohexane, (ii) 4,4'-dihydroxydiphenylsulfone, (iii) 9,9-bis(4-hydroxy-3-methylphenyl)fluorene and (vi) 1,1-bis(4-hydroxyphenyl)cyclohexane that are used as dihydroxy compounds.

The copolycarbonate resin having two types of the above structural unit (II) is composed of the structural units (I), (II-a) and (II-b). In this case, the molar percentage of the structural unit (I) based on the total of the structural unit (I) and the structural unit (II) (total of II-a and II-b) is 15 to 85%, preferably 20 to 80%, and the structural unit (II-a):structural unit (II-b) ratio by molar ratio is in the range of from 1:99 to 99:1, preferably 30:70 to 99:1, particularly preferably 40:60 to 95:5, most preferably in the range of from 50:50 to 90:10.

When two types of the structural unit (II) are used in combination as described above, there can be obtained a copolycarbonate resin and a plastic lens having a high glass transition temperature and an improved photoelasticity constant as compared with a case when (II-a) alone is used as a structural unit (II).

The copolycarbonate resin of the present invention can further contain a phosphorus-containing heat stabilizer for preventing a decrease in molecular weight and downgrading of a hue during molding. The heat stabilizer includes phosphorous acid, phosphoric acid, phosphinic acid, phosphonic acid and esters of these.

Specific examples of the heat stabilizer include triphenyl phosphite, tris(nonylphenyl) phosphate, tridecyl phosphate, trioctyl phosphite, trioctadecyl phosphate, didecylmonophenyl phosphate, dioctylmonophenyl phosphite, diisopropylmonophenyl phosphite, monobutyldiphenyl phosphite, monodecyldiphenyl phosphite, monooctyldiphenyl phosphite, tris(2,4-di-tert-butylphenyl)phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonooxoxenyl phosphate, dibutyl phosphate, dioctyl phosphate, diisopropyl phosphate, tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-isopropylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-biphenyl diphosphonite, dimethyl benzenephosphonate, diethyl benzenephosphonate and dipropyl benzenephosphonate. Of these, tris(2,4-di-tert-butylphenyl)phosphite, tetrakis(2,4-di-tert-butylphenyl)-4,4'-biphenylene diphosphonite and bis(2,4-di-tert-butylphenyl)-biphenyl phosphonite are preferred.

These heat stabilizers may be used alone or in combination of two or more. The amount of the heat stabilizer per 100 parts by weight of the copolycarbonate resin is preferably 0.001 to 0.15 part by weight.

The copolycarbonate resin of the present invention may contain a fatty acid ester compound for improving the releasability of the resin from a mold when it is molded.

The above fatty acid ester is preferably a partial ester or a full ester from a monohydric or polyhydric alcohol having 1 to 20 carbon atoms and a saturated fatty acid having 10 to 30 carbon atoms. The partial ester or the full ester from a monohydric or polyhydric alcohol and a saturated fatty acid is preferably selected from stearic acid monoglyceride, stearic acid diglyceride, stearic acid triglyceride, stearic acid monosorbitate, behenic acid monoglyceride, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate and 2-ethylhexyl stearate. Of these, stearic acid monoglyceride, stearic acid triglyceride and pentaerythritol tetrastearate are preferred. The amount of the fatty acid ester per 100 parts by weight of the copolycarbonate resin is preferably 0.001 to 0.5 part by weight.

The copolycarbonate resin of the present invention may further contain an ultraviolet absorbent for improving the resin in weatherability and intercepting undesired ultraviolet ray. Examples of the ultraviolet absorbent include benzophenone ultraviolet absorbents typified by 2,2'-dihydroxy-4-methoxybenzophenone, triazine ultraviolet absorbents typified by 2-(4,6-diphenyl-1,3,5-triazin-2-yl)-5-hexyloxyphenol, and benzotriazole ultraviolet absorbents typified by 2-(2H-benzotriazol-2-yl)-4-methylphenol, 2-(2H-benzotriazol-2-yl)-4-tert-octylphenol, 2-(2H-benzotriazol-2-yl)-4,6-bis(1-methy-1-phenylethyl)phenol, 2-(2H-benzotriazol-2-yl)-4,6-di-tert-pentylphenol, 2-(5-chloro-2H-benzotriazol-2-yl)-4-methyl-6-tert-butylphenol, 2-(5-chloro-2H-benzotriazol-2-yl)-2,4-tert-butylphenol and 2,2'-methylenebis[6-(2H-benzotriazol-2-yl)-4-(1,1,3,3-tetramethylbutyl)phenol]. These may be used alone or in combination of two or more. The amount of the ultraviolet absorbent per 100 parts by weight of the copolycarbonate resin is generally 0.01 to 1 part by weight, preferably 0.05 to 0.8 part by weight.

The copolycarbonate resin of the present invention may contain a bluing agent for offsetting a yellowish color caused by the polycarbonate resin or the ultraviolet absorbent when molded into a lens. Any bluing agent can be used without any limitation so long as it can be used in a polycarbonate resin. Generally, an anthraquinone dye is easily available and preferred.

Specifically, typical examples of the bluing agent include Common name Solvent Violet 13 (CA. No. (Color index No.) 60725; trade names "Macrolex Violet B" supplied by Bayer AG", "Diaresin Blue G" supplied by Mitsubishi Chemical Co., Ltd., and "Sumiplast Violet B" supplied by Sumitomo Chemical Co., Ltd.), Common name Solvent Violet 31 (CA. No. 68210; trade name; "Diaresin Violet D" supplied by Mitsubishi Chemical Co., Ltd.), Common name Solvent Violet 33 (CA. No. 60725; trade name; Diaresin Blue J supplied by Mitsubishi Chemical Co., Ltd.), Common name Solvent Blue 94 (CA. No. 61500; trade name; "Diaresin Blue N" supplied by Mitsubishi Chemical Co., Ltd.), Common name Solvent Violet 36 (CA. No. 68210; trade name; "Macrolex Violet 3R" supplied by Bayer AG), Common name Solvent Blue 97 (trade name "Macrolex Violet RR" supplied by Bayer AG), and Common name Solvent Blue 45 (CA. No. 61110; trade name "Tetrasole Blue RLS" supplied by Sandoz AG). Generally, the bluing agent is incorporated into the copolycarbonate resin in an amount of from $0.3 \times 10^{-4}$ to $2 \times 10^{-4}$ per 100 parts by weight of the copolycarbonate resin.

The copolycarbonate resin of the present invention may contain a generally known antioxidant for preventing oxidation. Examples thereof include phenol antioxidants, and specific examples thereof include triethylene glycol-bis(3-(3-tert-butyl-5-methyl-4-hydroxyphenyl)propionate), 1,6-hexanediol-bis(3-(3,5-di-tert-butyl-4-hydroxyphenyl) propionate, pentaerythritol-tetrakis(3-(3,5-di-tert-butyl-4-hydroxyphenyl)propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxybenzylphosphonate diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl) propionyloxy]ethyl}-2,4,8,10-tetraoxaspiro(5,5)undecane. The amount of the antioxidant per 100 parts by weight of the copolycarbonate resin is preferably 0.0001 to 0.05 part by weight.

When the above copolycarbonate resin is used to produce a plastic lens, a known method can be employed. Specifically, the plastic lens of the present invention can be formed by any one of various molding methods, such as injection molding, compression molding, extrusion molding or injection compression molding. Injection compression molding is the most preferred since a lens free of an optical strain can be formed. In the injection compression molding, preferably, the cylinder temperature is 180 to 300° C., and the mold temperature is 40 to 120° C.

The plastic lens of the present invention may be surface-coated with a protective layer such as a hard coating layer, an anti-reflection coating layer or an anti-clouding coating layer. These protective layers will be explained later.

The plastic lens of the present invention can be applied to various lenses such as a spectacle lens, a camera lens, a binocular lens, a microscope lens, a projector lens, a Fresnel lens, a lenticular lens, fθ lens, a headlamp lens, a pickup lens and the like. The plastic lens of the present invention is particularly the most suitably applied to a spectacle lens since it has an excellent balance between a refractive index and an Abbe's number.

For a hard coating (cured) layer formed on the lens substrate surface in the present invention, both a thermosetting hard coating layer and an actinic ray curable hard coating layer can be preferably used.

The thermosetting hard coating material includes a silicone resin such as organopolysiloxane and a melamine resin.

The above silicone resin can be selected from resins described in JP-A-48–056230, JP-A-49–014535, JP-A-08-054501 and JP-A-08–198985. For example, the above hard coating layer made of a silicon resin is a hard coating layer formed by drying and/or heat-curing a coating composition comprising an organosilicon compound of the general formula $$(R_1)_a(R_2)_b Si(OR_3)_{4-(a+b)} \qquad (*)$$

and/or a hydrolyzate thereof, wherein each of $R_1$ and $R_2$ is independently an organic group selected from the class consisting of an alkyl group, an allyl group, an acyl group, a halogen group, a glycidoxy group, an epoxy group, an amino group, a phenyl group, a mercapto group, a methacryloxy group and a cyano group, $R_3$ is an alkyl group having 1 to 10 carbon atoms, an alkoxy allyl group, an allyl group or an acyl group, and a and b are integers of 0 or 1.

Specific examples of the orgnosilicon compound include tetraalkoxysilanes such as methyl silicate, ethyl silicate, n-propyl silicate, iso-propyl silicate, n-butyl silicate, sec-butyl silicate and tert-butyl silicate or hydrolyzates of these, trialkoxysilanes such as methyltrimethoxysilane, methyltriethoxysilane, ethyltriethoxysilane, vinyltrimethoxysilane, phenyltrimethoxysilane, γ-chloropropyltrimethoxysilane, γ-mercaptopropyltrimethoxysilane, γ-methacryloxypropyltrimethoxysilane, γ-aminopropyltrimethoxysilane, γ-glycidoxypropyltrimethoxysilane, (3,4-epoxycyclohexyl) methyltrimethoxysilane, (3,4-epoxycyclohexyl) ethyltrimethoxysilane and γ-(3,4-epoxycyclohexyl) propyltrimethoxysilane or hydrolyzates of these, and dimethoxysilanes such as dimethyldimethoxysilane, dimethyldiethoxysilane, phenylmethyldimethoxysilane and γ-glycidoxypropylmethyldimethoxysilane or hydrolyzates of these.

These organosilicon compounds may be used alone or in combination of two or more.

The above organosilicon compounds are preferably used after hydrolyzed, for decreasing a curing temperature and promoting the curing. The hydrolysis is preferably carried out in the presence of an inorganic acid such as hydrochloric acid or sulfuric acid or an organic acid such as acetic acid. The degree of the hydrolysis can be easily controlled by adjusting the amount of the acid used. For carrying out uniform hydrolysis, an organic solvent may be used. The organic solvent is selected from an alcohol, a ketone, an ether, a cellosolve or an aromatic hydrocarbon. These solvents may be used alone or in combination of two or more.

The hard coating layer made of the melamine resin is a hard coating layer formed by drying and/or heat-curing a coating composition containing a melamine resin such as methylated methylolmelamine, propylated methylolmelamine, butylated methylolmelamine or isobutylated methylolmelamine, a crosslinking agent, a curing agent, and the like.

The above melamine resins may be used alone or in combination of two or more. Further, the hard coating layer may contain a modifier such as an acrylic resin, a polyether resin, a polyester resin or a silicone resin so long as the physical properties thereof are not impaired.

Examples of the curing agent include inorganic acids such as hydrochloric acid, sulfuric acid and nitric acid and organic acids such as oxalic acid, oxalic acid, maleic acid and p-toluenesulfonic acid.

Examples of the crosslinking agent include short-chain glycols such as ethylene glycol, diethylene glycol, butanediol and hexanediol and long-chain glycols such as polyethylene glycols. These may be incorporated alone or in combination of two or more.

In the melamine coating composition, the amount of each of the curing agent and the crosslinking agent is determined depending upon a purpose. The criterion of determination of the amount of the crosslinking agent is that the functional group of the melamine resin and the functional group of the crosslinking agent are equimolar. The amount of the crosslinking agent per 100 parts by weight of the melamine resin is preferably 10 to 200 parts by weight, more preferably 20 to 150 parts by weight. The amount of the curing agent per 100 parts by weight of the melamine resin is preferably 1 to 10 parts by weight, more preferably 2 to 7 parts by weight.

The solvent includes an alcohol, a ketone, an ether, a cellosolve and an aromatic hydrocarbon. These solvents may be used alone or in combination of two or more.

The actinic ray curing hard coating material can be selected from materials described in JP-A-54-097633, JP-A-03-145602 and JP-A-2000-229384. For example, the above material includes a polyfunctional compound having at least two actinic ray curable functional groups, such as compounds having unsaturated group, as the actinic ray curable functional groups, (meth)acryloyl groups, vinyl groups or allyl groups, preferably compounds having (meth)acryloyl groups. For example, the material is a poly(meth)acrylate formed from a compound having at least two hydroxyl groups such as polyhydric alcohol and (meth)acrylaic acid.

The above poly(meth)acrylate compound specifically includes the following compounds. For example, it includes 1,4-butanediol di(meth)acrylate, neopentyl glycol di(meth) acrylate, 1,6-hexanediol di(meth)acrylate, cyclohexanedimethanol di(meth)acrylate, polyethylene glycol di(meth)acrylate, glycerol tri(meth)acrylate, trimethylolpropane tri(meth)acrylate, ditrimethylolpropane tetra(meth) acrylate, pentaerythritol tri(meth)acrylate, pentaerythritol tetra(meth)acrylate, dipentaerythritol penta(meth)acrylate, dipentaerythritol hexa(meth)acrylate, tris(2-(meth) acryloyloxyethyl)isocyanurate, bis(2-(meth) acryloyloxyethyl)-2-hdyroxylethylisocyanurate, tris(2-(meth)acryloyloxypropyl)isocyanurate, bisphenol A dimethacrylate, tri(meth)acrylate of ethylene-oxide-added trimethylolpropane, tetra(meth)acrylate of ethylene-oxide-added pentaerythritol, hexa(meth)acrylate of ethylene-oxide-added dipentaerythritol and hexa(meth)acrylate of caprolactone-added dipentaerythritol.

Preferred are trimethylolpropane poly(meth)acrylate, pentaerythritol poly(meth)acrylate and isocyanurate poly (meth)acrylate.

In addition to the actinic ray curable functional groups, the above polyfunctional compound may have various functional groups and bonds such as a hydroxyl group, a carboxyl group, a halogen group, a urethane bond, an ether bond, an ester bond, a thioether bond, an amide bond and a diorganosiloxane bond. Particularly preferred is a (meth) acryloyl-group-containing compound having a urethane bond (to be sometimes referred to as "acrylurethane" hereinafter).

The acrylurethane included in the above polyfunctional compound includes a reaction product from a compound (1) having at least two isocyanate groups per molecule, a compound (2) having at least two hydroxyl groups per molecule, and a compound (3) having a hydroxyl group and a (meth)acryloyl group.

The compound (1) having at least two isocyanate groups per molecule includes 2,6-tolylene diisocyanate, 2,4-tolylene diisocyanate, diphenylmethane-4,4-diisocyanate, dicyclohexylmethane-4,4-diisocyanate, hexamethylene diisocyante, tetramethylene diisocyanate, phenylene diisocyanate, xylylene diisocyanate, tetramethylxylylene diisocyanate, 1,5-naphthalene diisocyanate, cyclohexane diisocyanate and isophorone diisocyanate.

The compound (2) having at least two hydroxyl groups per molecule includes polyhydric alcohols such as ethylene glycol, propylene glycol, 1,4-butanediol, 1,6-hexanediol, neopentyl glycol, cyclohexanedimethanol, diethylene glycol, trimethylolpropane, pentaerythritol, ditrimethylolpropane, dipentaerythritol and tris(2-hydroxyethyl)isocyanurate, polyalkylene glycols such as polyethylene glycol and polypropylene glycol, and polyester polyols obtained by condensation of the above polyhydric alcohols or polyalkylene glycols with polybasic acids (such as phthalic acid, terephthalic acid and maleic acid) or anhydrides thereof.

Specific examples of the compound (3) having a hydroxyl group and a (meth)acryloyl group include 2-hydroxyethyl (meth)acrylate, 2-hydroxypropyl (meth)acrylate, 4-hydroxybutyl (meth)acrylate, 2-hydroxy-3-chloropropyl (meth)acrylate, 4-hydroxycyclohexyl (meth)acrylate, 2-hydroxy-3-phenyloxypropyl (meth)acrylate and pentaerythritol acrylate.

The above acrylurethane that is a specifically preferred polyfunctional compound includes an acrylurethane that is a product from pentaerythritol or polypentaerythritol that is a polymer thereof, polyisocyanate and hydroxyalkyl (meth) acrylate, and an acrylurethane that is a reaction product from hydroxyl group-containing poly(meth)acrylate of pentaerythritol or polypentaerythritol and polyisocyanate.

When the curing is carried out with ultraviolet ray (UV) out of actinic rays for curing, a photopolymerization initiator is used. The above photopolymerization initiator includes aryl ketone photopolymerization initiators (such as acetophenones, benzophenones, benzoins and benzoin ethers), sulfur-containing photopolymerization initiators (such as sulfides and thioxantones), an acylphosphine oxide photopolymerization initiator, a diacylphosphine oxide photopolymerization initiator and other photopolymerization initiators.

The amount of the above photopolymerization initiator per 100 parts by weight of the UV-curable polyfunctional compound is preferably 0.01 to 20 parts by weight, particularly preferably 0.1 to 10 parts by weight.

For adjusting the coating composition to a proper viscosity, an organic solvent may be incorporated. The organic solvent includes an alcohol, a ketone, an ether, a cellosolve and an aromatic hydrocarbon. These solvents are used alone or in combination of two or more.

In addition to the above components, the coating composition may contain other components so long as the properties of a cured layer are not impaired. For example, the coating composition may contain a curing agent for promoting the reaction, an inorganic substance having the form of fine particles for adjusting the refractive index of the coating to the counterpart of various substrates, and various surfactants for improving wettability during application or the smoothness of a cured layer.

For improving a surface hardness, it is particularly suitable to use a colloidal silica that is a colloidal dispersion of high-molecular-weight anhydrous silicic acid in water and/or an organic solvent such as an alcohol. As a colloidal silica, it is preferred to use a dispersion of silica fine particles having a particle diameter of 1 to 100 $\mu$m. Further, the colloidal silica is preferably used in the amount range of 5 to 70% by weight for improving adhesion to an anti-reflection layer.

The coating may be colored by dispersing a colorant (a dye and a pigment) or a filler or by dissolving an organic polymer. Further, an ultraviolet absorbent and an antioxidant may be added.

The means for applying the coating composition to a substrate (plastic lens) is not restricted, and there may be employed known methods such as a dipping method, a spraying method, a spin coating method, a bar coating method, a flow coating method and a roll coating method. In view of surface accuracy, a dipping method and a spin coating method are preferred.

The coating composition applied onto the substrate is cured in the following manner, to form a hard coating layer. When the coating composition is a thermosetting hard coating material, it is cured by drying and/or heating after applied onto the substrate.

The temperature for drying and/or heating is preferably in the range of from 50° C. to 200° C., particularly preferably in the range of from 70° C. to 150° C.

The drying and/or heating is carried out until the cured layer has a sufficient hardness, and with an increase in the heating temperature, the time period required therefor decreases. The drying and/or heating may be carried out for 0.3 to 5 hours.

The actinic ray curable hard coating material is cured by irradiation with actinic ray such as UV ray, electron beam or laser, after applied to the substrate. While the actinic ray is not specially limited, UV ray is preferred. The source of the UV ray can be selected from a xenon lamp, a pulse xenon lamp, a low-pressure mercury lamp, a high-pressure mercury lamp, an ultrahigh-pressure mercury lamp, a metal halide lamp, a carbon arc lamp or a tungsten lamp.

For improving adhesion between the substrate and the hard coating layer, preferably, the substrate is pre-treated before the application of the coating composition. Examples of the pre-treatment include chemical treatment with an acid, an alkali or an organic solvent, physical treatment with plasma or ultraviolet ray, washing with various detergents, and primer treatment with various resins.

The hard coating layer cured by the above method preferably has a thickness of 1 to 50 $\mu$m. When the above thickness exceeds 50 $\mu$m, the curing is insufficient, and the adhesion to the substrate is liable to be impaired. When it is less than 1 $\mu$m, an outermost layer formed on this layer may fail to exhibit sufficient abrasion resistance and scratch resistance.

A single-layered or multi-layered anti-reflection layer may be formed on the above cured layer as required. The component for forming the anti-reflection layer is selected from known components such as inorganic oxides, fluorides or nitrides. Specific examples of the component include silicon dioxide, silicon monoxide, zirconium oxide, tantalum oxide, yttrium oxide, aluminum oxide, titanium oxide, magnesium fluoride and silicon nitride. The method for forming the above layer includes a vacuum deposition method, a sputtering method, an ion plating method and an ion beam assisting method. When the anti-reflection layer is formed, the lens is improved in anti-reflection performances. Further, an anti-clouding layer may be formed on the above cured layer or the above anti-reflection layer.

While the copolycarbonate resin of the present invention is useful for a plastic lens as described above, it has been found that the copolycarbonate resin of the present invention can give useful and high-performance molded articles on the basis of its excellent transparency, optical properties and flowability when molded into other optical molded article sheets and films.

According to the present invention, there is provided an optical molded article made of a copolycarbonate resin comprising the foregoing structural unit (I) and the foregoing structural unit (II), having a structural unit (I) molar percentage of 15 to 85% based on the total of the structural units (I) and (II) and having a specific viscosity of 0.25 to 0.6.

The above optical molded article can be any one of an optical disk substrate, a light diffusing plate, a light guiding plate, an optical card, an optical prism and an optical fiber. In a use other than the optical molded articles, the copolycarbonate resin of the present invention can be applied, for example, to a binder for an electrophotographic photoreceptor.

The copolycarbonate resin for the optical molded article preferably has a phenolic hydroxyl group (OH group) terminal content in the range of from 1 to 80 mol %, preferably from 2 to 70 mol %, based on the total content of terminals. Further, the copolycarbonate resin preferably has a structural unit (I) molar percentage of 20 to 80%, particularly preferably 30 to 70%, based on the total of the structural units (I) and (II), and further preferably, it has a specific viscosity in the range of from 0.25 to 0.56. The copolycarbonate resin further advantageously has a molecular weight distribution (Mw/Mn) in the range of from 1.1 to 3, preferably in the range of from 1.3 to 2.8.

An optical disk substrate is a typical example of the optical molded article. The optical disk substrate covers a compact disk for audio (recording density of approximately 650 MB per disk having a diameter of 12 cm) up to a high-density disk substrate. For example, DVD-ROM having a capacity of 4.7 GB for reproduction only is recently realized, and a capacity of 4.7 GB is being materialized for DVD-R, DVD-RW and DVD-RAM that permit recording and reproduction. As an MO disk having a size of 5.25", optical information recording media having a capacity of 5.2 GB on two surfaces are put on the market, and as an MO disk having a size of 3.5", optical information recording media having a capacity of 1.3 GB on one surface are put on the market. And, for coping with digital high-resolution broadcasting, there is desired a high-density optical recording medium having a capacity of approximately 6.5 GB or more, particularly, 10 GB or more on one surface as a disk having a diameter of 12 cm. The optical disk substrate of the present invention has properties adequate for application and adaptation thereto.

The optical disk substrate gives an optical disk when a metal thin layer is formed on at least one surface thereof. The metal includes aluminum, Tb, Fe, Co, Gd, SiN, ZnS—$SiO_2$, GeSbTe, ZnS and an aluminum alloy, and aluminum is suitable. The thin layer can be formed by means such as sputtering or vapor deposition. These means for forming the metal thin layer can be carried out by methods that are known per se.

The optical disk substrate can be obtained by molding the above copolycarbonate resin according to any method such as an injection molding method, a compression molding method or an extrusion method. For the optical disk of the present invention, an injection molding method is excellent in productivity and is therefore suitable.

The optical disk substrate is generally obtained by injection-molding the above polycarbonate resin at a resin temperature of 250 to 380° C. at a mold temperature of 60 to 130° C., or the optical disk substrate may be a disk formed by bonding thus-obtained substrates to each other.

According to the present invention, further, there is provided a film or a sheet formed of a copolycarbonate resin comprising the foregoing structural units (I) and (II), having a structural unit (I) molar percentage of 15 to 85% based on the total of the structural units (I) and (II) and having a specific viscosity of 0.3 to 0.7.

The copolycarbonate resin forming the film or the sheet preferably has a phenolic hydroxyl group (OH group) terminal content in the range of from 1 to 80 mol %, preferably from 2 to 70 mol %, based on the total content of terminals. Further, the copolycarbonate resin preferably has a structural unit (I) molar percentage of 20 to 80%, particularly preferably 30 to 70%, based on the total of the structural units (I) and (II), and further advantageously, it has a specific viscosity in the range of from 0.3 to 0.6 for the sheet or in the range of from 0.35 to 0.7 for the film. The copolycarbonate resin further advantageously has a molecular weight distribution (Mw/Mn) in the range of from 1.1 to 3, preferably in the range of from 1.3 to 2.8.

The sheet desirably has a thickness in the range of from 0.6 to 10 mm, particularly desirably in the range of from 0.8 to 8 mm. The film has a smaller thickness than the sheet, and the film generally has a thickness in the range of from 1 to 600 μm, preferably in the range of from 10 to 500 μm.

The film and the sheet can be produced by a method that is known per se.

For example, when the sheet is produced, a powder or pellets of the polycarbonate resin and predetermined amounts of additives (heat stabilizer, anti-oxidant, ultraviolet absorbent, mold release agent, colorant, etc.) are homogeneously mixed with any mixing means such as a tumbler, a V-type blender or a high-speed mixer, and the obtained mixture is molded, directly or after once pelletized with a vented single-screw or twin-screw extruder the pellets are molded, into a sheet-typed polycarbonate resin molded article by any method such as injection molding, extrusion molding, compression molding or rotary molding. Of these, a method of obtaining a sheet-shaped molded article by injection molding and a method of obtaining a resin plate (sheet) by extrusion molding are suitably employed, and an extrusion molding method is preferred. The method of obtaining a resin plate by extrusion molding includes a method in which a molten polycarbonate resin extruded with an extruder with a T die is taken up with cooling it with a cooling roll. In this case, the cooling roll is preferably set at a temperature in the range of from 50 to 200° C., particularly preferably in the range of from 60 to 120° C. The sheet can be suitably applied to a window glass and roof of an automobile, optical materials such as a phase difference plate, a polarizer and a light diffusing plate, building materials such as a wall material, a floor material, an arcade roof material, a veranda baseboard, a wind-shielding plate and a snow-shielding plate, a display case, a show window, various trays, various panels (instrument board protection cover), a shield for a helmet, and the like.

On the other hand, the method of forming the film is preferably a method which can provide a film excellent in thickness uniformity, which does not cause a gel, a fisheye, a scratch, etc., and which gives a film containing little foreign matter, and the method includes a solvent casting method, a melt-extrusion method and a calender method. When the film is used in an optical field, the film is required to have high uniformity, so that it is preferred to employ a method of solution casting. Generally, the casting method is preferably selected from a casting method in which a solution is extruded through a die or a doctor knife method. Examples of the solvent preferably include organic solvents such as methylene chloride, chloroform, dioxolane, toluene, dimethylformamide and N-methylpyrrolidone. These solvents may be used alone, or a mixture of at least two solvents may be used. A solution having a concentration of 5 to 50 wt % is preferably used.

The film produced by the above method can be suitably applied to a screen film of a television set, a phase difference film, a polarizing film, a display screen such as a plastic cell film and an insulating film.

According to the present invention, further, there is provided a copolycarbonate resin (A) (i) comprising the foregoing structural units (I) and (II), (ii) having a structural unit (I) molar percentage of 15 to 85% on the basis of the total of the structural units (I) and (II), (iii) having a specific viscosity of 0.3 to 0.7 and (iv) having a phenolic hydroxyl group (OH group) terminal content in the range of from 1 to 80 mol % based on the total terminal content.

In the above copolycarbonate resin (A), preferably, the structural unit (I) is represented by the following structural unit (I'), and in the steric configuration of two methylene groups bonding to 1,4-cyclohexylene group in the formula (I'), the trans/cis ratio is preferably in the range of from 100/0 to 50/50.

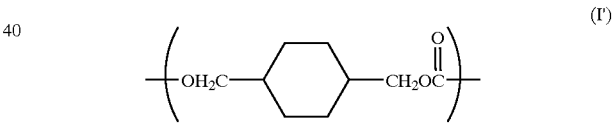

(I')

In the above copolycarbonate resin (A), more excellently, (ii) the molar percentage of the structural unit (I) based on the total of the structural units (I) and (II) is 20 to 80 mol %, and (iv) the content of the phenolic hydroxyl terminal group based on the total content of the total terminal group is in the range of from 2 to 70 mol %. Further, advantageously, the molecular weight distribution (Mw/Mn) is in the range of from 1.1 to 3.0, preferably in the range of from 1.3 to 2.8.

In the above copolycarbonate resin (A), more excellently, the structural unit (II) is the following structural unit (II-a).

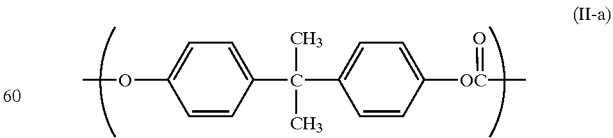

(II-a)

In the above copolycarbonate resin (A), preferably, the structural unit (I) is represented by the above structural unit (I'), and the structural unit (II) is a combination of the following structural units (II-a) and (II-b).

structural unit (II-a)

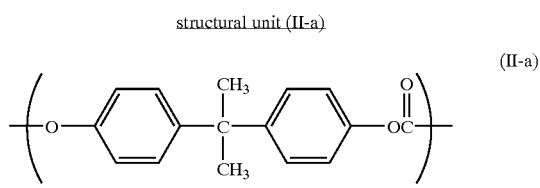
(II-a)

Structural Unit (II-b)

While the structural unit (II-b) is selected from the group consisting of the following (II-b-1) and (II-b-2), the unit (II-b-1) is more preferred.

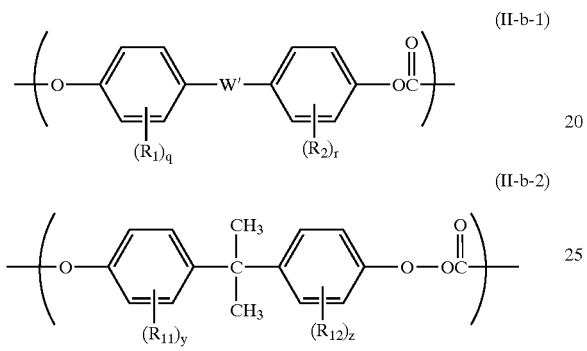

In the above units (II-b-1) and (II-b-2), each of $R_1$ and $R_2$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, each of q and r is an integer of 0 to 4, W' is an alicyclic hydrocarbon group having 5 to 12 carbon atoms or a group represented by the following,

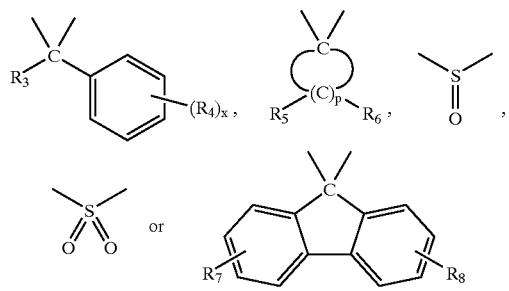

wherein $R_3$ and $R_4$ are the same as, or different from, each other, and each is a hydrogen atom or a hydrocarbon group having 1 to 10 carbon atoms, x is an integer of 1 to 5, each of $R_5$ and $R_6$ is independently a hydrogen atom or an alkyl group having 1 to 3 carbon atoms, p is an integer of 4 to 7, each of $R_7$ and $R_8$ is independently a hydrogen atom, a halogen atom or an alkyl group having 1 to 3 carbon atoms, each of $R_{11}$ and $R_{12}$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, and each of y and z is an integer of 1 to 4.

Of the above structural unit (II-b), (II-b-1) is preferred, and further, the following units are particularly preferred as the (II-b-1).

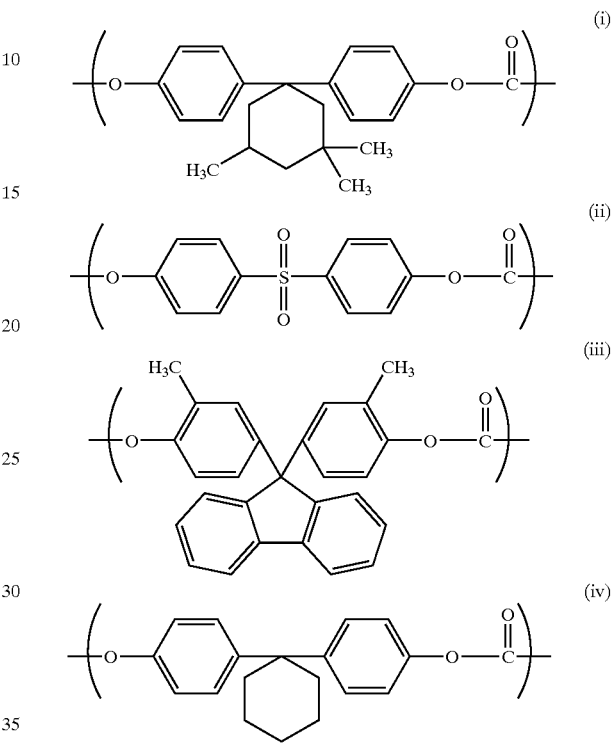

These units (i), (ii) (iii) and (vi) coming under (II-b) are structural units derived from (i) 1,1-bis(4-hydroxyphenyl)-3,3,5-trimethylcyclohexane, (ii) 4,4'-dihydroxydiphenylsulfone, (iii) 9,9-bis(4-hydroxy-3-methylphenyl)fluorene and (vi) 1,1-bis(4-hydroxyphenyl) cyclohexane that are used as dihydroxy compounds.

The copolycarbonate resin having two types of the above structural unit (II) is composed of the structural units (I'), (II-a) and (II-b). In this case, the molar percentage of the structural unit (I') based on the total of the structural unit (I') and the structural unit (II) (total of II-a and II-b) is 15 to 85%, preferably 20 to 80%, and the structural unit (II-a) :structural unit (II-b) ratio, by molar ratio, is in the range of from 1:99 to 99:1, preferably 30:70 to 99:1, particularly preferably 40:60 to 95:5, most preferably in the range of from 50:50 to 90:10.

When two types of the structural unit (II) are used in combination as described above, there can be obtained a copolycarbonate resin and a molded article having a high glass transition temperature and an improved photoelasticity constant as compared with a case when (II-a) alone is used as a structural unit (II).

The above copolycarbonate resin (A) can be produced by polymerizing dihydroxy compounds which are 15 to 85 mol % of cyclohexanedimethanol of the following formula (I-R) and 85 to 15 mol % of bisphenol of the following formula (II-R) and a carbonate ester according to an ester-exchange method.

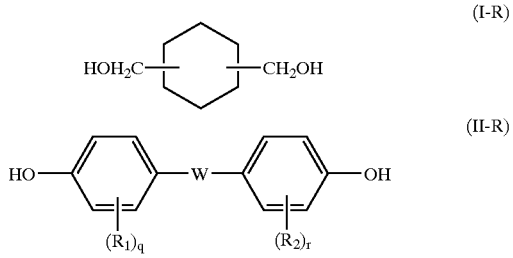

In the formula (II-R), $R_1$, $R_2$, W, q and r are as defined concerning the foregoing structural unit (II).

EXAMPLES

The present invention will be further explained with reference to Examples hereinafter. In Examples, "part" stands for "part by weight", and "%" stands for "% by weight". Various properties were evaluated by the following methods.

(1) Specific Viscosity

Measured in methylene chloride as a solvent having a concentration of 0.7 g/100 ml. The temperature for the measurement was set at 20° C.

(2) Refractive Index and Abbe's Number

A casting film (thickness 100 μm) of a polycarbonate resin was prepared and measured at 25° C. with an Abbe refractometer supplied by Atago K.K. using an diiodomethane as a contact liquid.

(3) Glass Transition Temperature (Tg)

Measured with DSC2910 supplied by T.A. Instruments Japan.

(4) Flowability (Q Value)

A volume that flowed out of a nozzle having a diameter of 1.0 mm with a cylinder having a diameter of 10 mm and a length of 20 mm was measured at 240° C. under a load of 100 kg with a flow tester CFT-500C supplied by Shimadzu Corporation.

(5) Photoelasticity Constant

A cast film having a thickness of 100 μm was measured with a photoelasticity measuring apparatus PA-150 supplied by Riken Kiki (K.K.).

(6) Ball Dropping Impact Test

A concave lens having a size of 7.7 mmΦ×1.5 mm was measured according to FDA standard. Specifically, a steel ball having a weight of 15.8 g was naturally dropped toward the central portion of the lens from a height of 127 cm for evaluation.

Evaluation criteria: ○: No breaking takes place. ×: Breaking takes place.

(7) Static Load Test

According to ISO 14889, a carbon paper sheet was placed on white paper, a lens was allowed to stand on the carbon paper sheet, a 100 N load was exerted on the upper portion of the lens for 10 seconds to evaluate the lens for a deformation. Lenses having a central thickness (CT) of 1.3 mm and 1.0 mm were evaluated.

Evaluation criteria: ○: No deformation, ×: Deformed (8) Terminal Groups: OH/(OH+Ar) Ratio A polymer was measured for $^1$HNMR spectrum. Integral values of protons (two protons) on carbon in the o-position aromatic carbon to which terminal groups (OH) of phenolic hydroxy groups and protons (two protons) on carbon in the m-position out of aromatic carbon bonding to carbonate oxygen atom of an aryl terminal group (Ar) were used to calculate an (OH)/(OH+Ar) ratio. The NMR used was JNM-AL400 supplied by JEOL.

(9) Weight Average Molecular Weight (Mw)/Number Average Molecular Weight (Mn)

HLC-8220GPC supplied by Toso Ltd. was used to carry out polystyrene conversion measurement according to a gel permeation column chromatography method (GPC method). Three columns having an inner diameter of 4.6 cm and a length of 15 cm were used. The columns were packed with TSK-gel Super HZ4000, 3000 and 2000 as fillers, respectively. Chloroform was flowed at a rate of 0.35 ml/minute as a mobile layer at 40° C. to detect with 254 nm ultraviolet beam.

(10) Ratio of Trans-Isomeric Compound and Cis-Isomeric Compound of 1,4-cyclohexanedimethanol 1,4-Cyclohexandedimethanol was measured for $^1$HNMR, and a ratio of a trans-isomeric compound and a cis-isomeric compound was determined on the basis of an integral ratio of protons assigned to methylene group bonding to a 1,4-cyclohexylene group (trans-isomeric compound: δ3.42 ppm, 2H, cis-isomeric compound: δ3.50 ppm, 2H). The NMR used was JNM-AL400 supplied by JEOL.

(11) Hetero-Carbonate Ratio

In this description, an aliphatic-aromatic carbonate ester on a main polymer chain is called "hetero-carbonate (to be abbreviated as "Hetero" hereinafter), and aromatic-aromatic and aliphatic-aliphatic carbonate esters are called "homo-carbonates" (to be abbreviated as "Homo" hereinafter). In this case, the hetero-carbonate ratio is defined as follows.

Hetero-carbonate ratio=Hetero/(Homo+Hetero)

Concerning the hetero-carbonate ratio, a polymer was measured for $^1$HNMR, signals derived from Hetero and Homo were assigned with regard to a specific proton, and the ratio was determined on the basis of integral ratio of the signals. For a method of determining the above hetero-carbonate ratio, Example 10 is referred to hereinafter as a specific example. The NMR used was JNM AL400 supplied by JEOL.

(12) Scratch Resistance Test

A coating layer was rubbed in reciprocal directions 10 times each with #0000 steel wool, and a scratched state on the surface was visually observed to evaluate the state on the basis of five ratings.

1: Damaged when a coating layer was rubbed 10 times under a load of 100 g.

2: Damaged when a coating layer was rubbed 10 times under a load of 500 g.

3: Damaged a little when a coating layer was rubbed 10 times under a load of 500 g.

4: Slightly damaged when a coating layer was rubbed 10 times under a load of 500 g.

5: Not damaged at all when a coating layer was rubbed 10 times under a load of 500 g.

(13) Adhesion Test

According to JIS K5400, a coating layer on a substrate was cross-cut at intervals of 1 mm to form 100 squares by a cutter knife, an adhesive tape (trade name: "Cellotape") supplied by Nichiban K.K. was pressed thereon and strongly peeled off in the vertical direction, and the adhesion was evaluated on the basis of squares remaining on the substrate.

(14) Water Absorption

According to ASTM D-0570, a sample was immersed in water at 23° C. for 24 hours and measured for a water absorption.

(15) Total Light Transmissivity

According to ASTM D-1003, a sample was measured with a haze meter NDH2000 supplied by Nippon Denshoku K.K.

(16) Pencil Hardness

A substrate surface was measured for a hardness according to a pencil hardness test, and the results were evaluated on the basis of three ratings relative to a substrate made of a bisphenol-A-type polycarbonate resin.

Evaluation criteria: ◯: Harder, Δ: to a similar degree, ×: Softer

(17) Weatherability

A molded flat plate (thickness 2 mm) as a sample was exposed for 500 hours with a sunshine carbon arc lamp weatherability tester defined in JIS D0205 (sunshine weatherometer WEL-SUN-HCH-B, supplied by Suga Testing Machines K.K.), and the sample was evaluated for yellow degrees (Y1) before and after the exposing.

(18) Measurement for Phase Difference (R value)

A phase difference R value is a product of a refractive index Δn and a film thickness d and represented by R=Δn·d. A casting film of polycarbonate resin which was monoaxially stretched was measured with an ellipsometer M-150 supplied by Nippon Bunkosha K.K.

(19) Solubility Test 10 g of a polymer was added to 100 ml of a solvent (methylene chloride, tetrahydrofuran), the mixture was stirred with a magnetic stirrer for 1 hour, and the solution was visually observed for solubility.

Evaluation criteria: ◯: Transparent, Δ: Partially insoluble, ×: Insoluble

Example 1

A reactor with a stirrer, a distiller and a decompressing device was charge with 72.0 parts of 1,4-cyclohexanedimethanol (to be sometimes referred to as "CHDM" hereinafter), 114 parts of bisphenol A (to be sometimes referred to as "BPA" hereinafter), 220 parts of diphenyl carbonate (to be sometimes referred to as "DPC" hereinafter), 0.18 part of tetramethylammonium hydroxide (to be sometimes referred to as "TMAH" hereinafter) and $8 \times 10^{-4}$ part of sodium hydroxide, and, after nitrogen substitution, the mixture was dissolved at 140° C. The mixture was stirred for 30 minutes, and then, while the temperature inside the reactor was increased to 180° C., the pressure in the reactor was gradually reduced. The mixture was allowed to react at $1.33 \times 10^4$ Pa for 30 minutes, and phenol formed was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure in the reactor was gradually reduced to 133 Pa or lower at 240° C. After the pressure reached 133 Pa or lower, the reaction mixture was allowed to react for 4 hours with stirring. As a deactivator, $2.3 \times 10^{-2}$ part of dodecylbenzenesulfonic acid tetrabutylphosphonium salt was added, then, the mixture was stirred at 240° C. at $1.33 \times 10^4$ Pa for 20 minutes, and then a reaction product was ejected from a bottom of the reactor under nitrogen pressure. The reaction product was cut with a pelletizer with cooling it in a water vessel to form pellets. The obtained pellets were injection-compression-molded with a mold for a spectacle concave lens at a cylinder temperature of 220 to 240° C. at a mold temperature of 65° C., to obtain a lens. The lens had excellent transparency and also had an excellent appearance. Table 1 shows results of various evaluations.

Example 2

A polycarbonate resin and a lens were obtained in the same manner as in Example 1 except that 43.2 parts of CHDM and 160 parts of BPA were used. The lens had excellent transparency and also had an excellent appearance. Table 1 shows results of various evaluations.

Example 3

A polycarbonate resin and a lens were obtained in the same manner as in Example 1 except that BPA was replaced with 134 parts of 1,1-bis(4-hydroxyphenyl)cyclohexane (bisphenol-Z, to be sometimes referred to as "BPZ" hereinafter). The lens had excellent transparency and also had an excellent appearance. Table 1 shows results of various evaluations.

Example 4

A polycarbonate resin and a lens were obtained in the same manner as in Example 1 except that 101 parts of CHDM and 113 parts of 9,9-bis(4-hydroxy-3-methylphenyl)fluorene (to be sometimes referred to as "BCF" hereinafter) were used. The lens had excellent transparency and also had an excellent appearance. Table 1 shows results of various evaluations.

Comparative Example 1

Polycarbonate resin pellets of bisphenol A type ("Panlite L-1250" supplied by Teijin Chemicals, Ltd.) were evaluated. The pellets were injection-compression-molded at a cylinder temperature of 280 to 300° C. at a mold temperature of 125° C., to obtain a lens. Table 1 shows results of evaluations thereof.

Comparative Example 2

Pellets were prepared in the same manner as in Example 1 except that 144 parts of CHDM alone was used. The obtained pellets were injection-compression-molded with a mold for a spectacle concave lens at a cylinder temperature of 180 to 210° C. at a mold temperature of 40° C., to form a lens. Table 1 shows results of various evaluations.

TABLE 1

|  | Unit | Ex. 1 | Ex. 2 | Ex. 3 | Ex. 4 | C. Ex. 1 | C. Ex. 2 |
|---|---|---|---|---|---|---|---|
| CHDM amount | mol % | 50 | 30 | 50 | 70 | 0 | 100 |
| BP amount | mol % | BPA50 | BPA70 | BPZ50 | BCF30 | BPA100 | 0 |
| Specific viscosity | dl/g | 0.432 | 0.374 | 0.332 | 0.300 | 0.419 | 0.316 |
| Refractive index |  | 1.555 | 1.566 | 1.562 | 1.572 | 1.584 | 1.498 |
| Abbe's number |  | 38 | 34 | 38 | 32 | 30 | 58 |
| Tg | ° C. | 93 | 113 | 106 | 116 | 150 | 58 |
| Q value | $10^{-3}$ cm$^3$/s | 161 | 55 | 53 | 37 | 4.2 | 887 |
| Photoelasticity constant | $10^{-8}$ cm$^2$/N | 62 | 75 | 52 | 33 | 79 | — |
| OH/(OH + Ar) | % | 28 | 22 | 8 | 10 | — | — |
| Mw/Mn |  | 2.355 | 2.380 | 2.516 | 2.530 | — | — |
| Ball dropping impact test |  | ◯ | ◯ | ◯ | ◯ | ◯ | — |

TABLE 1-continued

|  | Unit | Ex. 1 | Ex. 2 | Ex. 3 | Ex. 4 | C. Ex. 1 | C. Ex. 2 |
|---|---|---|---|---|---|---|---|
| Static load test (CT 1.3 mm) |  | ○ | ○ | ○ | ○ | — | — |
| Static load test (CT 1.0 mm) |  | ○ | ○ | ○ | ○ | — | — |

Ex.: Example
C. Ex.: Comparative Example

Referential Example 1 (Synthesis and purification of 1,4-cyclohexanedimethanol)

250 Parts of dimethyl 1,4-cyclohexanedicarboxylate and 25 parts of a copper-chromium catalyst were placed in an autoclave having a volume of 2 liters, and the mixture was stirred at 260° C. and reduced with hydrogen under a hydrogen pressure of 15 MPa. Then, the catalyst was removed by filtration, methanol formed as a side product was removed from an obtained filtrate by concentration, and the remaining filtrate was distilled under reduced pressure (160–175° C./1.33–2.00×10$^3$ Pa), to give 1,4-cyclohexanedimethanol (to be sometimes referred to as "CHDM" hereinafter). This product was subjected to $^1$H-NMR (JNM-AL400 supplied by JEOL) to show an isomer structure ratio of 71% of a trans-isomeric compound and 29% of a cis-isomeric compound (CHDM1).

300 g of the above-obtained CHDM1 was completely dissolved in 600 ml of ethyl acetate at a temperature of 70° C., and then the solution was cooled to 5° C. to recrystallize the CHDM1. The crystal was recovered by filtration, washed with ethyl acetate and dried at 30° C. with a vacuum dryer to give 200 g of a crystal (yield 66%). The obtained crystal had a structural isomer ratio of 88% of a trans-isomeric compound and 12% of a cis-isomeric compound (CHDM2).

Ethyl acetate was removed from the filtrate obtained by the above procedure, under reduced pressure (2.7×10$^3$ Pa) at 30° C., and then the filtrate was dried under reduced pressure (67 Pa) at 25° C., to give 90 g of CHDM. This product had a structural isomer ratio of 50% of an trans-isomeric compound and 50% of a cis-isomeric compound (CHDM4).

100 g of the above CHDM2 was recrystallized in ethyl acetate twice (250 ml for the first time and 50 ml for the second time) in the same manner as above, to give 56 g of a crystal (yield 36%). The obtained crystal had a structural isomer ratio of 99% of a trans-isomeric compound and 1% of a cis-isomeric compound (CHDM3).

Example 5

A reactor with a stirrer, a distiller and a decompressing device was charged with 72.0 parts of the above-obtained CHDM1, 114 parts of BPA, 220 parts of DPC, 0.18 part of tetramethylammonium hydroxide and 8×10$^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually reduced. The mixture was allowed to react at 1.33×10$^4$ Pa for 30 minutes, and phenol formed was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the pressure reached 133 Pa or lower, the reaction mixture was allowed to react for 4 hours with stirring. As a deactivator, 2.3×10$^{-2}$ part of dodecylbenzenesulfonic acid tetrabutylphosphonium salt was added, and after a reaction product was stirred at 240° C. at 1.33×10$^4$ Pa for 20 minutes, the reaction product was ejected through a bottom of the reactor under nitrogen pressure, and cut with a pelletizer with cooling it in a water vessel to form pellets. The obtained pellets were injection-compression-molded with a mold for a spectacle concave lens at a cylinder temperature of 220 to 240° C. at a mold temperature of 65° C., to obtain a lens. The lens had excellent transparency and also had an excellent appearance. Table 2 shows results of various evaluations.

Example 6

A polycarbonate resin and a lens were obtained in the same manner as in Example 5 except that CHDM2 obtained in Referential Example 1 was used. The lens had excellent transparency and also had an excellent appearance. Table 2 shows results of various evaluations.

Example 7

A polycarbonate resin and a lens were obtained in the same manner as in Example 5 except that CHDM3 obtained in Referential Example 1 was used. The lens had excellent transparency and also had an excellent appearance. Table 2 shows results of various evaluations.

Example 8

A polycarbonate resin and a lens were obtained in the same manner as in Example 5 except that CHDM4 obtained in Referential Example 1 was used. The lens had excellent transparency and also had an excellent appearance. Table 2 shows results of various evaluations.

TABLE 2

|  | Unit | Ex. 5 | Ex. 6 | Ex. 7 | Ex. 8 |
|---|---|---|---|---|---|
| CHDM trans/cis ratio |  | 71/29 | 88/12 | 99/1 | 50/50 |
| CHDM amount | mol % | 50 | 50 | 50 | 50 |
| BP amount | mol % | BPA50 | BPA50 | BPA50 | BPA50 |
| Specific viscosity | dl/g | 0.432 | 0.414 | 0.416 | 0.409 |
| Refractive index |  | 1.555 | 1.554 | 1.555 | 1.555 |
| Abbe's number |  | 38 | 38 | 38 | 38 |
| Tg | ° C. | 93 | 95 | 96 | 89 |
| Q value | 10$^{-3}$ cm$^3$/s | 161 | 111 | 109 | 208 |

TABLE 2-continued

| | Unit | Ex. 5 | Ex. 6 | Ex. 7 | Ex. 8 |
|---|---|---|---|---|---|
| Photoelasticity constant | $10^{-8}$ cm$^2$/N | 62 | 65 | 65 | 65 |
| Ball dropping impact test | | ○ | ○ | ○ | ○ |

Ex.: Example

Example 9

A reactor with a stirrer, a distiller and a decompressing device was charged with 43.2 parts of CHDM, 68.4 parts of BPA, 135 parts of DPC, 0.11 part of tetramethylammonium hydroxide and $5 \times 10^{-4}$ part by weight of sodium hydroxide, and after nitrogen substitution, the mixture was dissolved at 140° C. The mixture was stirred for 30 minutes, and then, while the temperature in the reactor was increased to 180° C., the pressure in the reactor was gradually reduced. The mixture was allowed to react at $1.33 \times 10^4$ Pa for 30 minutes, and phenol formed was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the pressure reached 133 Pa or lower, the reaction mixture was allowed to react for 4 hours with stirring. As a deactivator, $1.4 \times 10^{-2}$ part of dodecylbenzenesulfonic acid tetrabutylphosphonium salt was added, and after a reaction product was stirred at 240° C. at $1.33 \times 10^4$ Pa for 20 minutes, the reaction product was ejected through a bottom of the reactor under nitrogen pressure, and cut with a pelletizer with cooling it in a water vessel to form pellets. The method of calculating a heterocarbonate ratio of the above polycarbonate resin will be shown below.

With regard to specific protons of the above polycarbonate resin (protons (two protons) on carbon of CHDM contiguous to carbonate oxygen atom in this case, (to be referred to as "R-H" hereinafter) and protons (two protons) on carbon contiguous to an aromatic carbon bonding to an oxygen atom of BPA (to be referred to as "Ar—H" hereinafter), Table 3 shows assignment results of $^1$H-NMR (shift values and integral ratio of signals).

TABLE 3

| Assigned protons | Chemical shift value (ppm) | Integral value |
|---|---|---|
| Homo (Ar—H) | 7.15–7.17 | 0.8974 |
| Hetero (Ar—H) | 7.06–7.08 | 2.0000 |
| All R—H(Homo + Hetero) | 3.94–4.18 | 2.8718 |

In Hetero, integral ratios of R—H and Ar—H come to be the same as each other, so that the integral value of Hetero (R—H) is equal to that of Hetero (Ar—H) in Table 3 and is therefore 2.0000. The integral value of Homo (R—H) can be therefore determined as follows.

(All R—H)–(Hetero (R—H))=2.8718–2.0000=0.8718

And, since Hetero=Hetero (Ar—H)+Hetero (R—H)= 2.0000+2.0000, and since Homo=Homo (Ar—H)+Homo (R—H)=0.8974+0.8718, it is determined that Heterocarbonate ratio–Hetero/(Homo+Hetero)–0.69.

The obtained pellets were injection-compression-molded with a mold for a spectacle concave lens at a cylinder temperature of 220 to 240° C. at a mold temperature of 65° C., to obtain a lens. The lens had excellent transparency and also had an excellent appearance. Table 4 shows results of various evaluations.

Example 10

A polycarbonate resin and a lens were obtained in the same manner as in Example 9 except that 25.9 parts of CHDM and 95.8 parts of BPA were used. The lens had excellent transparency and also had an excellent appearance. Table 4 shows results of various evaluations.

Example 11

A reactor with a thermometer and a stirrer was charged with 59.0 parts of CHDM, 93.4 parts of BPA and 2.08 parts of p-tert-butylphenol, and after nitrogen substitution, 646 parts of pyridine well dried beforehand and 2,440 parts of methylene chloride were added, to be dissolved. 93.2 of phosgene was blown into the mixture at 25° C. over 90 minutes under stirring. After completion of the blowing of the phosgene into the mixture, the mixture was stirred for approximately 10 minutes, to complete the reaction. After completion of the reaction, the reaction product was diluted with methylene chloride, pyridine was removed by neutralization with hydrochloric acid, and then, the reaction product was repeatedly washed with water until it had an electric conductivity equal to that of deionized water. Then, methylene chloride was evaporated, to give a colorless powder. Table 4 shows the results of evaluations of the thus-obtained polycarbonate resin.

Example 12

A polycarbonate resin was obtained in the same manner as in Example 11 except that 13.3 parts of CHDM, 49.1 parts of BPA, 1.08 parts of p-tert-butylphenol, 35.0 parts of phosgene, 248 parts of pyridine and 690 parts of methylene chloride were used. Table 4 shows the results of evaluations of the thus-obtained polycarbonate resin.

TABLE 4

| | Unit | Ex. 9 | Ex. 10 | Ex. 11 | Ex. 12 |
|---|---|---|---|---|---|
| CHDM amount: m | mol % | 50 | 30 | 50 | 30 |
| BP amount: n | mol % | BPA50 | BPA70 | BPA50 | BPA70 |
| Hetero-carboflate ratio | | 0.69 | 0.55 | 0.44 | 0.42 |
| 2.05 × m × n | | 0.51 | 0.43 | 0.51 | 0.43 |
| Specific viscosity | dl/g | 0.432 | 0.374 | 0.462 | 0.455 |
| Refractive index | | 1.555 | 1.566 | 1.552 | 1.566 |

TABLE 4-continued

|  | Unit | Ex. 9 | Ex. 10 | Ex. 11 | Ex. 12 |
|---|---|---|---|---|---|
| Abbe's number |  | 38 | 34 | 38 | 33 |
| Q value | $10^{-3}$ cm$^3$/s | 161 | 55 | 30 | 18 |
| Photoelasticity constant | $10^{-8}$ cm$^2$/N | 62 | 75 | 63 | 67 |

Ex.: Example

Example 13

A reactor with a stirrer, a distiller and a decompressing device was charged with 72.0 parts of CHDM, 114 parts of BPA, 220 parts of DPC, 0.18 part of tetramethylammonium hydroxide and $8 \times 10^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually decreased. The mixture was allowed to react at $1.33 \times 10^4$ Pa for 30 minutes, and formed phenol was distilled off. While the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the vacuum degree reached 133 Pa or lower, the reaction mixture was allowed to react for 4 hours with stirring. As a deactivator, $2.3 \times 10^{-2}$ part of dodecylbenzenesulfonic acid tetrabutylphosphonium salt was added, and further, per 100 parts of the resin, 0.03 part of tetrakis(2,4-di-tert-butylphenyl)-4,4'-biphenylenediphosphonite, 0.3 part of 2,2'-methylenebis[6-(2H-benzotriazol-2-yl)-4-(1,1,3,3-tetramethylbutyl)phenol, 0.2 part of stearic acid monoglyceride and $6 \times 10^{-5}$ part of Macroviolet B supplied by Bayer AG as a bluing agent were added. Then, the mixture was stirred at 240° C. at $1.33 \times 10^4$ Pa for 20 minutes, and a reaction product was ejected through a bottom of the reactor under nitrogen pressure, and cut with a pelletizer with cooling it in a water vessel to form pellets.

The obtained pellets were injection-compression-molded with a mold for a spectacle concave lens at a cylinder temperature of 220 to 240° C. at a mold temperature of 650° C., to obtain a lens. The lens had excellent transparency and also had an excellent appearance.

A UV-curable coating composition containing trimethylolpropane (meth)acrylate as a main component was uniformly applied to the above lens by a dipping method. The coating was dried at room temperature and then cured at a conveyor speed of 4 m/minute at an exposure dose of 650 mJ/cm$^2$ by UV irradiation device. The coated lens had an excellent appearance, and no deformation in the lens substrate was found before and after the UV curing. Table 5 shows results of various evaluations.

TABLE 5

|  | Unit | Ex. 13 |
|---|---|---|
| CHDM amount | mol % | 50 |
| BP amount | mol % | BPA50 |
| Specific viscosity | dl/g | 0.432 |
| Refractive index |  | 1.555 |
| Abbe's number |  | 38 |
| Tg | ° C. | 93 |
| Q value | $10^{-3}$ cm$^3$/s | 161 |
| Photoelasticity constant | $10^{-8}$ cm$^2$/N | 62 |

TABLE 5-continued

|  | Unit | Ex. 13 |
|---|---|---|
| Ball dropping impact test |  | ○ |
| Scratch resistance |  | 4 |
| Adhesion |  | 100/100 |

Ex.: Example

Example 14

A reactor with a stirrer, a distiller and a decompressing device was charged with 43.2 parts of CHDM, 68.4 parts of BPA, 135 parts of DPC, 0.11 part of TMAH and $5 \times 10^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually decreased. The mixture was allowed to react at $1.33 \times 10^4$ Pa for 30 minutes, and formed phenol was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower. After the vacuum degree reached 133 Pa or lower, the reaction mixture was allowed to react for 4 hours with stirring. As a deactivator, $1.4 \times 10^{-2}$ part of dodecylbenzenesulfonic acid tetrabutylphosphonium salt was added. Then, the mixture was stirred at 240° C. at $1.33 \times 10^4$ Pa for 20 minutes, and a reaction product was ejected through a bottom of the reactor under nitrogen pressure, and cut with a pelletizer with cooling it in a water vessel to form pellets. Per 100 parts of the resin, 0.003 part of tris(2,4-di-tert-butylphenyl) phosphite, 0.005 part of trimethyl phosphate and 0.0045 part of stearic acid monoglyceride were added. Then, the above resin was melt-kneaded with a vented twin-screw extruder (KTX-46, supplied by Kobe Steel, Ltd.) at a cylinder temperature of 240° C. with degassing, and the resin was re-pelletized. The thus-obtained pellets were injection-molded with M35B-D-DM supplied by Sumitomo Heavy Machinery, Inc., Meiki Seisakusho, at a resin temperature 240° C. at a mold temperature of 70° C. for a cooling time period of 15 seconds at an injection rate of 150 mm/second (filling time period 0.43 second), to obtain a disk substrate having a diameter of 120 mm and a thickness of 1.2 mm. Further, aluminum was vapor-deposited on the disk substrate. The distortion of the disk caused by water absorption was remarkably smaller than that of a disk obtained in Comparative Example 3. Table 6 shows evaluation results.

Example 15

A disk was obtained in the same manner as in Example 14 except that 25.9 parts of CHDM and 95.8 parts of BPA were used. The distortion of the disk caused by water absorption was remarkably smaller than that of a disk obtained in Comparative Example 3. Table 6 shows evaluation results.

Example 16

A disk was obtained in the same manner as in Example 14 except that 60.5 parts of CHDM and 68.0 parts of BCF were used. The distortion of the disk caused by water absorption was remarkably smaller than that of a disk obtained in Comparative Example 3. Table 6 shows evaluation results.

Comparative Example 3

A bisphenol A (BPA) type polycarbonate resin powder obtained by an interfacial polymerization method was palletized in the same manner as in Example 12, and a disk substrate was obtained by injection molding. Further, aluminum was vapor-deposited on the disk substrate. Table 6 shows evaluation results.

TABLE 6

|  | Unit | Ex. 14 | Ex. 15 | Ex. 16 | C. Ex. 3 |
|---|---|---|---|---|---|
| CHDM amount | mol % | 50 | 30 | 70 | — |
| BP amount | mol % | BPA50 | BPA70 | BCF30 | BPA100 |
| Specific viscosity | dl/g | 0.432 | 0.374 | 0.300 | 0.289 |
| Q value | $10^{-3}$ cm$^3$/s | 161 | 55 | 37 | 27 |
| Photoelasticity constant | $10^{-8}$ cm$^2$/N | 62 | 75 | 33 | 79 |
| Water absorption | wt % | 0.13 | 0.12 | 0.086 | 0.23 |

Ex.: Example
C. Ex.: Comparative Example

Example 17

A reactor with a stirrer, a distiller and a decompressing device was charged with 72.0 parts of CHDM, 114 parts of BPA, 220 parts by weight of DPC, 0.18 part of TMAH and $8 \times 10^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually decreased. The mixture was allowed to react at $1.33 \times 10^4$ Pa for 30 minutes, and formed phenol was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the pressure reached 133 Pa or lower, the reaction mixture was allowed to react for 4 hours with stirring. As a deactivator, $2.3 \times 10^{-2}$ part of dodecylbenzenesulfonic acid tetrabutylphosphonium salt was added. Then, the mixture was stirred at 240° C. at $1.33 \times 10^4$ Pa for 20 minutes, and a reaction product was ejected through a bottom of the reactor under nitrogen pressure, and cut with a pelletizer with cooling it in a water vessel to form pellets. The thus-obtained pellets were injection-molded with a 3-ounce injection molding machine (Neomat 150/75 model, supplied by Sumitomo Heavy Machinery, Inc.) at a cylinder temperature of 230° C. at a mold temperature of 60° C., to obtain plates having a length of 60 mm and a width of 80 mm (0 to 20 mm wide and 1 mm thick, 20 to 60 mm wide and 2 mm thick, and 60 to 80 mm wide and 3 mm thick plates). These sheets had excellent transparency and also had an excellent appearance. Table 7 shows results of various evaluations.

Comparative Example 4

Polycarbonate resin pellets of bisphenol A type ("Panlite L-1250" supplied by Teijin Chemicals, Ltd.) were evaluated. The pellets were molded at a cylinder temperature of 280° C. at a mold temperature of 110° C., to obtain plates having a length of 60 mm and a width of 80 mm (0 to 20 mm wide and 1 mm thick, 20 to 60 mm wide and 2 mm thick, and 60 to 80 mm wide and 3 mm thick plates). Table 7 shows results of various evaluations.

TABLE 7

|  | Unit | Ex. 17 | C. Ex. 4 |
|---|---|---|---|
| CHDM amount | mol % | 50 | 0 |
| BP amount | mol % | BPA50 | BPA100 |
| Specific viscosity | dl/g | 0.432 | 0.426 |
| Refractive index |  | 1.555 | 1.584 |
| Tg | ° C. | 93 | 150 |
| Q value | $10^{-3}$ cm$^3$/s | 161 | 4.2 |
| Photoelasticity constant | $10^{-8}$ cm$^2$/N | 62 | 78 |
| Total light transmissivity | % | 91.6 | 91.0 |
| Pencil hardness |  | ○ | Δ |
| Water absorption | wt % | 0.13 | 0.23 |
| Climate resistance |  | 5.9 | 7.3 |

Ex.: Example
C. Ex.: Comparative Example

Example 18

A reactor with a stirrer, a distiller and a decompressing device was charged with 72 parts of CHDM, 114 parts of BPA, 220 parts of DPC, 0.18 part of TMAH and $8 \times 10^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually decreased. The mixture was allowed to react at $1.33 \times 10^4$ Pa for 30 minutes, and formed phenol was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the pressure reached 133 Pa or lower, the reaction mixture was allowed to react for 4 hours with stirring. As a deactivator, $2.3 \times 10^{-2}$ part of dodecylbenzenesulfonic acid tetrabutylphosphonium salt was added. Then, the mixture was stirred at 240° C. at $1.33 \times 10^4$ Pa for 20 minutes, and a reaction product was ejected through a bottom of the reactor under nitrogen pressure, and cut with a pelletizer with cooling it in a water vessel to form pellets. The thus-obtained pellets were dissolved in methylene chloride to prepare a solution having a concentration of 40% by weight. The polycarbonate solution was cast on a glass plate at 15° C. with an applicator, and while the temperature is gradually increased, methylene chloride was evaporated. The cast layer was peeled off the glass plate and further heated to remove methylene chloride, whereby a A4-sized film having a length of 297 mm, a width of 210 mm and a thickness of 156 μm was obtained. The film had excellent transparency and had excellent film formability by casting. Then, the film was 150% monoaxially stretched at 100° C. by a tenter method, to give a stretched film having a thickness of 127 μm. The film showed a phase difference of R (550 nm)=800 nm.

Table 8 shows results of various evaluations.

Example 19

A A4-sized film having a thickness of 77 μm was obtained in the same manner as in Example 18 except that 101 parts of CHDM and 113 parts of BCF were used. The film had excellent transparency and had excellent film formability by casting. Then, the film was 150% monoaxially stretched at 100° C. by a tenter method, to give a stretched film having a thickness of 63 μm. The film showed a phase difference of R (550 nm)=29 nm.

Table 8 shows results of various evaluations.

Comparative Example 5

A polycarbonate resin powder of bisphenol A type ("Panlite C-1400" supplied by Teijin Chemicals, Ltd.) was evaluated. The powder was dissolved in methylene chloride to prepare a solution having a concentration of 20% by weight. The polycarbonate solution was cast on a glass plate at 15° C. with an applicator, and while the temperature is gradually increased, methylene chloride was evaporated. The cast layer was peeled off the glass plate and further heated to remove methylene chloride, whereby a A4-sized film having a length of 297 mm, a width of 210 mm and a thickness of 100 μm was obtained. The film had excellent transparency and had excellent film formability by casting. Then, the film was 150% monoaxially stretched at 160° C. by a tenter method.

Table 8 shows results of various evaluations.

TABLE 8

|  | Unit | Ex. 18 | Ex. 19 | C. Ex. 5 |
|---|---|---|---|---|
| CHDM amount | mol % | 50 | 70 | 0 |
| BP amount | mol % | BPA50 | BCF30 | BPA100 |
| Specific viscosity | dl/g | 0.432 | 0.300 | 0.419 |
| Refractive index |  | 1.555 | 1.572 | 1.584 |
| Abbe's number |  | 38 | 32 | 30 |
| Tg | ° C. | 93 | 116 | 150 |
| Photoelasticity constant | $10^{-8}$ cm$^2$/N | 62 | 33 | 78 |
| Total light transmissivity | % | 94 | 91 | 90 |
| Solubility (CH$_2$Cl$_2$) |  | ○ | ○ | ○ |
| Solubility (THF) |  | ○ | ○ | Δ |

Ex. Example
C. Ex. Comparative Example
CH$_2$Cl$_2$: Methylene chloride
THF: Tetrahydrofuran Example 20

A reactor with a stirrer, a distiller and a decompressing device was charged with 72.0 parts of CHDM, 91.2 parts of BPA, 31 parts of 1,1-bis(4-hydroxyphenyl)-3,3,5-trimethylcyclohexane (to be abbreviated as "BPTMC" hereinafter), 220 parts of DPC, 0.18 part of tetramethylammonium hydroxide and $8\times10^{-4}$ part of sodium hydroxide, and after nitrogen substitution, the mixture was dissolved at 140° C. The mixture was stirred for 30 minutes, and then, while the temperature in the reactor was increased to 180° C., the pressure in the reactor was gradually decreased. The mixture was allowed to react at $1.33\times10^4$ Pa for 30 minutes, and formed phenol was distilled off. Then, while the above pressure was maintained, the temperature was increased repeatedly, and the mixture was allowed to react at 190° C. for 30 minutes, at 200° C. for 40 minutes, at 220° C. for 30 minutes, and further at 240° C. for 30 minutes, with distilling off phenol. Then, the pressure was gradually reduced to 133 Pa or lower at 240° C. After the pressure reached 133 Pa or lower, the reaction mixture was allowed to react for 4 hours with stirring. As a deactivator, $2.3\times10^{-2}$ part of dodecylbenzenesulfonic acid tetrabutylphosphonium salt was added, and after a reaction product was stirred at 240° C. at $1.33\times10^4$ Pa for 20 minutes, the reaction product was ejected through a bottom of the reactor under nitrogen pressure, and cut with a pelletizer with cooling it in a water vessel to form pellets. The obtained pellets were injection-compression-molded with a mold for a spectacle concave lens at a cylinder temperature of 220 to 240° C. at a mold temperature of 65° C., to obtain a lens. The lens had excellent transparency and also had an excellent appearance. Table 9 shows results of various evaluations.

Example 21

A polycarbonate resin and a lens were obtained in the same manner as in Example 20 except that the amount of BPA was change from 91.2 parts to 57.0 parts and that 31 parts of BPTMC was replaced with 67.0 parts of BPZ. The lens had excellent transparency and also had an excellent appearance. Table 9 shows results of various evaluations.

Example 22

A polycarbonate resin and a lens were obtained in the same manner as in Example 20 except that 31 parts of BPTMC was replaced with 37.8 parts of BCF. The lens had excellent transparency and also had an excellent appearance. Table 9 shows results of various evaluations.

Example 23

A reactor with a stirrer was charged with 8.4 parts of CHDM, 8.0 parts of BPA, 5.9 parts of 4,4'-dihydroxydiphenylsulfone (to be sometimes referred to as "BPS" hereinafter) and 0.09 parts of p-tert-butylphenol, and after nitrogen substitution, 95 parts of pyridine well dried beforehand and 263 parts of methylene chloride were added, to be dissolved. While the mixture was stirred, 14 parts of phosgene was blown into the mixture at 25° C. over 70 minutes. After completion of the blowing of the phosgene into the mixture, the mixture was stirred for approximately 10 minutes, to complete the reaction. After completion of the reaction, the reaction product was diluted with methylene chloride, pyridine was removed by neutralization with hydrochloric acid, and then, the reaction product was repeatedly washed with water until it had an electric conductivity equal to that of deionized water. Then, methylene chloride was removed to give a colorless powder. The thus-obtained powder was palletized with an extruder, and then, the pellets were injection-compression-molded into a leans with a mold for a spectacle concave lens. The lens had excellent transparency and also had an excellent appearance. Table 9 shows results of various evaluations.

TABLE 9

|  | Unit | Ex. 20 | Ex. 21 | Ex. 22 | Ex. 23 |
|---|---|---|---|---|---|
| CHDM amount | mol % | 50 | 50 | 50 | 50 |
| BP amount | mol % | BPA40 | BPA25 | BPA40 | BPA30 |
|  |  | BPTMC10 | BPZ25 | BCF10 | BPS20 |
| Specific viscosity | dl/g | 0.468 | 0.337 | 0.300 | 0.535 |
| Refractive index |  | 1.549 | 1.557 | 1.563 | 1.557 |
| Abbe's number |  | 38 | 38 | 34 | 36 |
| Tg | ° C. | 107 | 102 | 106 | 108 |
| Photoelasticity constant | $10^{-8}$ cm$^2$/N | 54 | 79 | 54 | 66 |

TABLE 9-continued

|  | Unit | Ex. 20 | Ex. 21 | Ex. 22 | Ex. 23 |
|---|---|---|---|---|---|
| Q value | $10^{-3}$ cm$^3$/s | 72 | 64 | 136 | 92 |
| Ball dropping impact test |  | ○ | ○ | ○ | ○ |

Ex.: Example

What is claimed is:

1. A plastic lens formed of a copolycarbonate resin comprising a structural unit (I) of the following general formula (I),

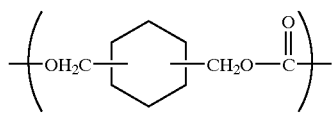
(I)

and a structural unit (II) of the following formula (II),

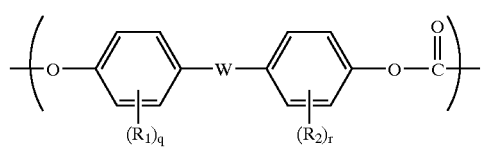
(II)

the structural unit (I) having a molar amount percentage of 15 to 85% on the basis of the total amount of the structural units (I) and (II), wherein, in said structural unit (II), each of $R_1$ and $R_2$ is independently a halogen atom, an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms or an aralkyloxy group having 7 to 20 carbon atoms, each of q and r is independently an integer of 0 to 4, W is a group represented by

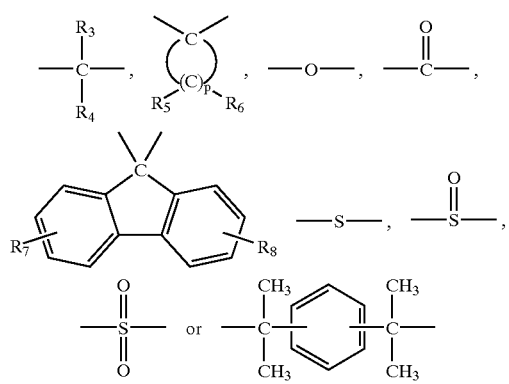

wherein $R_3$ and $R_4$ are the same as, or different from, each other and each is a hydrogen atom or a hydrocarbon group having 1 to 10 carbon atoms, each of $R_5$ and $R_6$ is independently a hydrogen atom or an alkyl group having 1 to 3 carbon atoms, p is an integer of 4 to 7, and each of $R_7$ and $R_8$ is independently a hydrogen atom, a halogen atom or an alkyl group having 1 to 3 carbon atoms.

2. The plastic lens of claim 1, wherein the structural unit (I) is represented by the following structural unit (I').

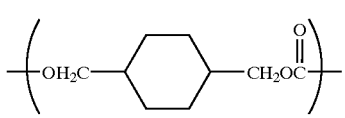
(I')

3. The plastic lens of claim 1, wherein W in the structural unit (II) is a group represented by

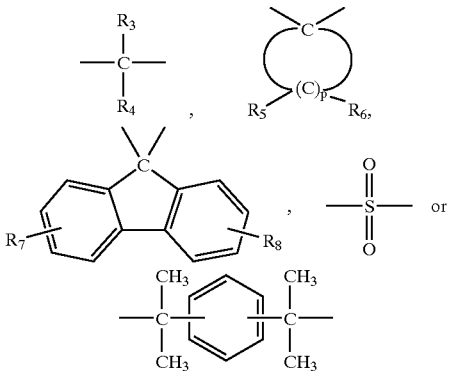

wherein $R_3$, $R_4$, $R_5$, $R_6$, $R_7$, $R_8$ and p are as defined concerning said structural unit (II).

4. The plastic lens of claim 1, wherein the structural unit (II) is represented by the following structural unit (II-1) or (II-2).

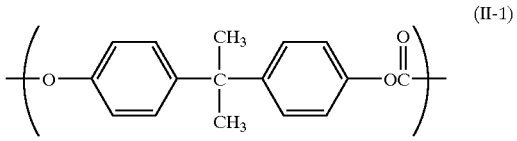
(II-1)

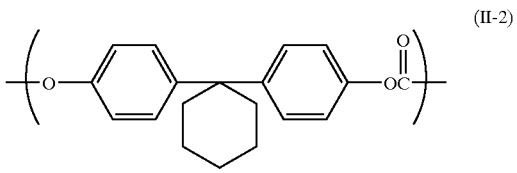
(II-2)

5. The plastic lens of claim 1, wherein the molar percentage of the structural unit (I) of the copolycarbonate resin is 20 to 80% based on the total amount of the structural units (I) and (II).

6. The plastic lens of claim 1, wherein the copolycarbonate resin has a specific viscosity of 0.3 to 0.6.

7. The plastic lens of claim 1, wherein the copolycarbonate resin has a specific viscosity of 0.3 to 0.56.

8. The plastic lens of claim 1, wherein the copolycarbonate resin has a phenolic hydroxyl terminal group (OH group) in the range of from 1 to 80 mol % based on the total terminal group.

9. The plastic lens of claim 1, wherein the copolycarbonate resin has a phenolic hydroxyl terminal group (OH group) in the range of from 1 to 80 mol % based on the total terminal group and has a weight average molecular weight/number average molecular weight ratio (Mw/Mn) in the range of from 1.1 to 3.

10. The plastic lens of claim 1, wherein the structural unit (I) is represented by the foregoing structural unit (I') and two methylene groups bonding to a 1,4-cyclohexylene group of the formula (I') have a steric configuration having a trans/cis ratio in the range of from 100/0 to 50/50.

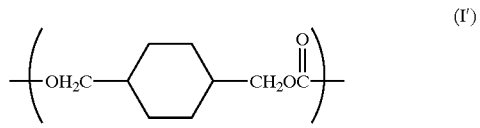

(I')

11. The plastic lens of claim 1, wherein the copolycarbonate resin has a flowability value (Q value), measured by a measurement method defined in the specification, in the range of from $20 \times 10^{-3}$ to $200 \times 10^{-3}$ cm$^3$/s.

12. The plastic lens of claim 1, which has a refractive index in the range of from 1.500 to 1.600.

13. The plastic lens of claim 1, which has an Abbe's number in the range of from 31 to 48.

14. The plastic lens of claim 1, wherein the copolycarbonate resin contains 0.01 to 1 part by weight, per 100 parts by weight of said resin, of an ultraviolet absorbent.

15. The plastic lens of claim 1, wherein the copolycarbonate resin contains $0.3 \times 10^{-4}$ to $2.0 \times 10^{-4}$ part by weight, per 100 parts by weight of said resin, of a bluing agent.

16. The plastic lens of claim 1, which has a hard coating layer formed on one surface or has a hard coating layer on one surface and a hard coating layer on the other surface.

17. The plastic lens of claim 1, which is a spectacle lens.

18. The plastic lens of claim 1, wherein the copolycarbonate resin is a resin obtained by an ester-exchange method.

19. An optical molded article formed of a copolycarbonate resin comprising said structural units (I) and (II), having a structural unit (I) molar percentage of 15 to 85% based on the total of the structural units (I) and (II) and having a specific viscosity of 0.25 to 0.6.

20. The optical molded article of claim 19, which is an optical disk substrate, a light-diffusing plate, a light-guiding plate, an optical card, an optical prism or an optical fiber.

21. The optical molded article of claim 19, wherein the copolycarbonate resin has a phenolic hydroxyl terminal group (OH group) in the range of from 1 to 80 mol % based on the total terminal group.

22. The optical molded article of claim 19, wherein the copolycarbonate resin has a phenolic hydroxyl terminal group (OH group) in the range of from 1 to 80 mol % based on the total terminal group and has a weight average molecular weight/number average molecular weight ratio (Mw/Mn) in the range of from 1.1 to 3.

23. A film or sheet formed of a copolycarbonate resin comprising said structural units (I) and (II), having a structural unit (I) molar percentage of 15 to 85% based on the total of the structural units (I) and (II) and having a specific viscosity of 0.3 to 0.7.

24. The film or sheet of claim 23, wherein the copolycarbonate resin has a phenolic hydroxyl terminal group (OH group) in the range of from 1 to 80 mol % based on the total terminal group.

25. The film or sheet of claim 23, wherein the copolycarbonate resin has a phenolic hydroxyl terminal group (OH group) in the range of from 1 to 80 mol % based on the total terminal group and has a weight average molecular weight/number average molecular weight ratio (Mw/Mn) in the range of from 1.1 to 3.

26. A copolycarbonate resin comprising (i) said structural units (I) and (II), (ii) the structural unit (I) having molar percentage in the range of from 15 to 85 % based on the total of the structural units (I) and (II), (iii) having a specific viscosity of 0.3 to 0.7 and (iv) having a phenolic hydroxyl terminal group (OH group) in the range of from 1 to 80 mol % based on the total terminal group.

27. The copolycarbonate resin of claim 26, which has a phenolic hydroxyl terminal group (OH group) in the range of from 1 to 80 mol % based on the total terminal group and has a weight average molecular weight/number average molecular weight ratio (Mw/Mn) in the range of from 1.1 to 3.

28. The copolycarbonate resin of claim 26, wherein the structural unit (I) is represented by the following structural unit (I') and two methylene groups bonding to a 1,4-cyclohexylene group of the formula (I') have a steric configuration having a trans/cis ratio in the range of from 100/0 to 50/50.

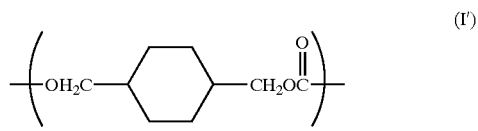

(I')

29. The copolycarbonate resin of claim 26, wherein the structural unit (II) is the following structural unit (II-a).

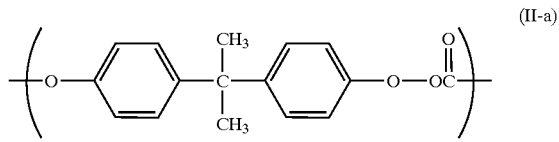

(II-a)

30. The copolycarbonate resin of claim 26, wherein (ii) the molar percentage of the structural unit (I) is 20 to 80 mol % based on the total of the structural units (I) and (II) and (iv) the content of the phenolic hydroxyl terminal group (OH group) based on the total terminal group is in the range of from 2 to 70 mol %.

31. The copolycarbonate resin of claim 26, wherein the structural unit (II) is formed of the following structural units (II-a) and (II-b) and has a structural unit (II-a):structural unit (II-b) ratio in the range of from 1:99 to 99:1, the structural unit (II-a) being represented by the following formula (II-a),

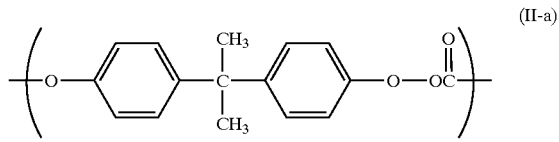

(II-a)

the structural unit (II-b) being a unit selected from the group consisting of the following formulae (II-b-1) and (II-b-2),

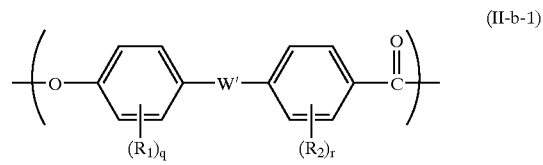

(II-b-1)

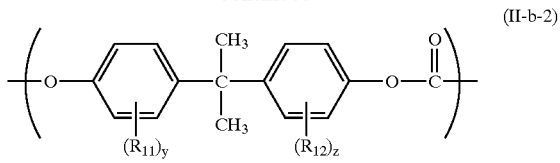

wherein, in the foregoing units (II-b-1) and (II-b-2), each of $R_1$ and $R_2$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, each of q and r is an integer of 0 to 4, W' is an alicyclic hydrocarbon group having 5 to 12 carbon atoms or a group represented by the following,

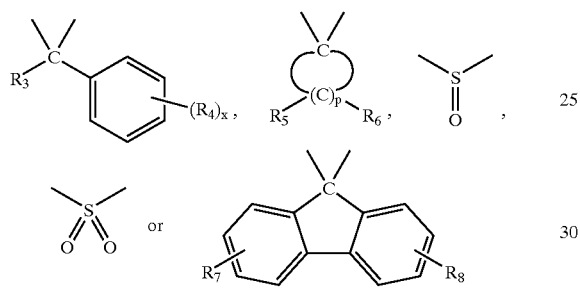

wherein $R_3$ and $R_4$ are the same as, or different from, each other, and each is a hydrogen atom or a hydrocarbon group having 1 to 10 carbon atoms, x is an integer of 1 to 5, each of $R_5$ and $R_6$ is independently a hydrogen atom or an alkyl group having 1 to 3 carbon atoms, p is an integer of 4 to 7, each of $R_7$ and $R_8$ is independently a hydrogen atom, a halogen atom or an alkyl group having 1 to 3 carbon atoms, each of $R_{11}$ and $R_{12}$ is independently an alkyl group having 1 to 10 carbon atoms, an alkoxy group having 1 to 10 carbon atoms, a cycloalkyl group having 6 to 20 carbon atoms, a cycloalkoxy group having 6 to 20 carbon atoms, an aryl group having 6 to 10 carbon atoms, an aralkyl group having 7 to 20 carbon atoms, an aryloxy group having 6 to 10 carbon atoms, an aralkyloxy group having 7 to 20 carbon atoms or a halogen atom, and each of y and z is an integer of 1 to 4.

32. A method for producing the copolycarbonate resin of claim 26, which comprises polymerizing a dihydroxy compound obtained from 15 to 85 mol % of cyclohexanedimethanol of the following formula (I-R) and 85 to 15 mol % of bisphenol of the following formula (II-R) and a carbonate ester by an ester-exchange method,

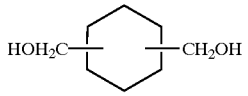

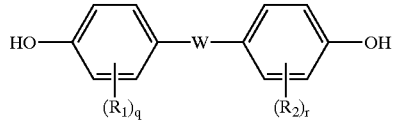

wherein, in the formula (II-R), $R_1$, $R_2$, W, q and r are as defined concerning foregoing structural unit (II).

* * * * *